(12) United States Patent
Douglas et al.

(10) Patent No.: US 12,503,308 B2
(45) Date of Patent: Dec. 23, 2025

(54) AUTOMATED ROBOTIC REPLENISHMENT SYSTEM

(71) Applicant: Staples, Inc., Framingham, MA (US)

(72) Inventors: Matthew Robert Douglas, Orlando, FL (US); Paolo Gerli, Westborough, MA (US); Gregory Patrick Cox, Sleepy Hollow, NY (US); Amit Kalra, Acton, MA (US); Brandon Lam, Rockland, MA (US); Ruchi Tewari, Hopkinton, MA (US); Daniel Jarvis, Holliston, MA (US); Nikhil Variar, Needham, MA (US); Naveen Challapalli, Cambridge, MA (US)

(73) Assignee: Staples, Inc., Framingham, MA (US)

( * ) Notice: Subject to any disclaimer, the term of this patent is extended or adjusted under 35 U.S.C. 154(b) by 722 days.

(21) Appl. No.: 17/817,596

(22) Filed: Aug. 4, 2022

(65) Prior Publication Data

US 2024/0043212 A1  Feb. 8, 2024

(51) Int. Cl.
| | |
|---|---|
| *B65G 1/137* | (2006.01) |
| *B07C 3/08* | (2006.01) |
| *B07C 5/38* | (2006.01) |
| *B25J 9/00* | (2006.01) |
| *B65G 1/04* | (2006.01) |

(Continued)

(52) U.S. Cl.
CPC ............. *B65G 1/137* (2013.01); *B07C 3/08* (2013.01); *B07C 5/38* (2013.01); *B25J 9/0093* (2013.01); *B65G 1/0492* (2013.01); *B65G 1/065* (2013.01); *B65G 1/1371* (2013.01); *B65G 1/1373* (2013.01); *B65G 1/1378* (2013.01); *B66F 9/063* (2013.01); *G06K 7/10861* (2013.01); *G06Q 10/087* (2013.01)

(58) Field of Classification Search
CPC ...... B65G 1/137; B65G 1/0492; B65G 1/065; B65G 1/1373; B65G 1/1378; B65G 1/1371; B07C 3/08; B07C 5/38; B25J 9/0093; B66F 9/063; G06K 7/10861; G06Q 10/087

See application file for complete search history.

(56) References Cited

U.S. PATENT DOCUMENTS

| | | |
|---|---|---|
| 12,024,367 B1 | 7/2024 | Day et al. |
| 2014/0244026 A1 | 8/2014 | Neiser |

(Continued)

FOREIGN PATENT DOCUMENTS

| | | |
|---|---|---|
| DE | 102020126911 A1 | 4/2022 |
| WO | 2023/061332 A1 | 4/2023 |

*Primary Examiner* — Thomas Randazzo
(74) *Attorney, Agent, or Firm* — VLP Law Group, LLP; Michel Bohn

(57) ABSTRACT

An automated robotic replenishment system is described. In an example implementation, the system may include containers adapted to hold items; container transportation devices adapted to transport the containers to a replenishment station; and the replenishment station. The replenishment station may include a container receiving area, a mobile storage unit receiving space, and a robotic arm, which may pick up items from the container in the container receiving area and place the item into a mobile storage unit in the mobile storage unit receiving space. The system may also include an automated guided vehicle that transports the mobile storage unit between the replenishment station and a storage area of a fulfillment center.

22 Claims, 12 Drawing Sheets

(51) Int. Cl.
*B65G 1/06* (2006.01)
*B66F 9/06* (2006.01)
*G06K 7/10* (2006.01)
*G06Q 10/087* (2023.01)

(56) References Cited

U.S. PATENT DOCUMENTS

| | | |
|---|---|---|
| 2015/0073589 A1 | 3/2015 | Khodl et al. |
| 2016/0347545 A1 | 12/2016 | Lindbo et al. |
| 2017/0043953 A1 | 2/2017 | Battles et al. |
| 2018/0096299 A1* | 4/2018 | Jarvis .................. G01C 21/206 |
| 2018/0127212 A1* | 5/2018 | Jarvis .................... G05D 1/247 |
| 2018/0194556 A1* | 7/2018 | Lert, Jr. ............... B65G 1/0492 |
| 2018/0362270 A1 | 12/2018 | Clucas et al. |
| 2019/0033837 A1 | 1/2019 | Zanger et al. |
| 2020/0130936 A1 | 4/2020 | Shekhawat et al. |
| 2020/0316786 A1* | 10/2020 | Galluzzo ................ B25J 11/008 |
| 2021/0245956 A1* | 8/2021 | Douglas ............... B65G 1/1375 |
| 2021/0322993 A1 | 10/2021 | Guarracina et al. |
| 2021/0395007 A1* | 12/2021 | Galluzzo ............. B65G 1/1371 |
| 2022/0113384 A1* | 4/2022 | Joseph ................... G01S 17/89 |
| 2022/0315338 A1* | 10/2022 | Malhotra ............ B65G 1/1373 |
| 2022/0402134 A1 | 12/2022 | Pidaparthi et al. |
| 2023/0230031 A1* | 7/2023 | Lert, Jr. ............... G06Q 10/087 |
| | | 705/28 |
| 2024/0029145 A1* | 1/2024 | Lert, Jr. ............. G06Q 30/0635 |
| 2024/0383139 A1 | 11/2024 | Douglas et al. |

* cited by examiner

AUTOMATED ROBOTIC REPLENISHMENT SYSTEM

BACKGROUND

This application relates to warehouse fulfillment systems. For example, this application relates to an automated system for replenishing storage units.

Some current fulfillment systems use storage units into which items are placed and stored. In some systems, when an order is fulfilled, a picker may travel to a storage unit and remove an item from the storage unit to fulfill an order for the item. In some systems, storage units may be transported by robots to a picker at a central location at which the picker may pick items from the storage units to fulfill orders. Regardless of the system, additional items must be replenished into storage units.

Often, replenishment of items is performed manually. For instance, in some current systems, human warehouse associates open packages and/or pallets, count out an appropriate quantity of items, and manually place them into or onto the storage units. For example, because pallets received at a fulfillment center may include many types of items and lack organization, typical processes require significant amounts of manual handling, searching, and counting. Sorting and counting items, along with matching them to storage units, can be very cumbersome, inefficient, and waste significant labor.

Often, such processes require human associates to follow many instructions, manually count items, and physically perform a number of tasks which lead to mental and physical fatigue and, accordingly, reduce speed and overall throughput. Furthermore, these systems lead to errors due to human's inability to reliably count and place hundreds or thousands of items.

Accordingly, structures, methods, and system are desirable to improve over these existing solutions, for example, for improving flow, automation, speed, and accuracy.

SUMMARY

An automated robotic replenishment system can be configured to perform particular operations or actions by virtue of having software, firmware, hardware, or a combination of them installed on the system that in operation causes or cause the system to perform the actions. One general aspect of the system includes one or more containers adapted to hold one or more items; one or more container transportation devices adapted to transport the one or more containers to one or more container receiving areas of a replenishment station; the replenishment station including the one or more container receiving areas, one or more mobile storage unit receiving spaces, and a robotic arm, the robotic arm adapted to pick up the one or more items from the one or more containers in the one or more container receiving areas, move the one or more items, and place the one or more items into one or more mobile storage units in the one or more mobile storage unit receiving spaces; and one or more automated guided vehicles ("AGVs") adapted to transport the one or more mobile storage units between the one or more mobile storage unit receiving spaces and a mobile storage unit storage area.

Implementations of the system may include one or more of the following features. The system further including: that each of the one or more container transportation devices include a horizontal sliding mechanism supporting a container and allowing the container to slide between a decanting area and a container receiving area of the one or more container receiving areas; that each of the one or more container transportation devices include a handle adapted to push or pull the container horizontally on the horizontal sliding mechanism when force is applied to the handle; that the replenishment station includes two or more container receiving areas and two or more mobile storage unit receiving spaces; that the two or more container receiving areas are located on a first side of the replenishment station; and that the two or more mobile storage unit receiving spaces are located on a second side of the replenishment station, the first side being perpendicular to the second side relative to the robotic arm.

Implementations of the system may include one or more of the following features, such as that the mobile storage unit storage area includes a storage area where a set of mobile storage units are stored, the storage area including a first set of shelves, and a mobile storage unit staging area associated with the replenishment station where a subset of the set of mobile storage units are stored, the one or more AGVs being adapted to transport one or more of the subset of mobile storage units between the first set of shelves and the mobile storage unit staging area; that the mobile storage unit staging area includes a second set of shelves adapted to hold the subset of mobile storage units, the second set of shelves being fewer in quantity than the first set of shelves, the second set of shelves being separate from and closer to the replenishment station than the first set of shelves; and a scanner communicatively coupled with a processor, the scanner capturing an identification of a pallet, the processor adapted to instruct the one or more AGVs to transport the one or more mobile storage units to the mobile storage unit staging area based on the identification of the pallet.

Another general aspect includes a method including: identifying, by one or more processors communicatively coupled with a replenishment station, one or more item types of the first set of items; instructing one or more AGVs to transport a first mobile storage unit to a first space of one or more mobile storage unit spaces at the replenishment station, the first mobile storage unit being selected from a plurality of mobile storage units based on the one or more item types; transporting, by one or more conveyance devices, a first set of items to the replenishment station, the replenishment station including a robotic arm, one or more conveyance device receiving areas, and the one or more mobile storage unit spaces; and instructing the replenishment station to move a first item of the first set of items from the one or more conveyance devices into the first mobile storage unit at the first space.

Implementations of the operations may include one or more of the following features. Receiving scan data identifying a pallet, the pallet holding a plurality of items having a plurality of item types, the plurality of items including the first set of items; moving one or more of the first set of items having the one or more item types from the pallet onto the one or more conveyance devices; determining the plurality of item types based on the scan data identifying the pallet; responsive to receiving the scan data, instructing the one or more AGVs to transport the first mobile storage unit from a storage area of a fulfillment center to a staging area associated with the replenishment station; determining a set of mobile storage units associated with the plurality of item types, the set of mobile storage units being in a storage area of a fulfillment center, each of the set of mobile storage units holding less than a full capacity of an item associated with that mobile storage unit, the set of mobile storage units including the first mobile storage unit; instructing the one or more AGVs to transport the set of mobile storage units from the storage area to a staging area associated with the replenishment station; instructing the one or more AGVs to transport the first mobile storage unit from the staging area associated with the replenishment station to the first space at the replenishment station; determining a set of mobile storage units associated with the plurality of item types based on the scan data, each of the set of mobile storage units storing at least one of the plurality of item types; and determining a subset of the set of mobile storage units based on a current quantity of items stored in each of the subset of mobile storage units, the first mobile storage unit being selected from the subset of the mobile storage units.

Implementations of the operations may include one or more of the following features. Placing the first set of items in a container in a decanting area of a fulfillment center, the one or more conveyance devices including the container transported between the decanting area and the one or more conveyance device receiving areas of the replenishment station by one or more of a conveyor belt, conveyor rollers, and the one or more AGVs; that identifying the one or more item types of the first set of items includes receiving scan data at the replenishment station, the scan data identifying one or more of the one or more item types and the one or more conveyance devices; that identifying the one or more item types of the first set of items includes receiving first scan data identifying the one or more item types at a decanting area, receiving second scan data identifying a container at the decanting area, the one or more conveyance devices including the container, associating the container with the one or more item types in computer memory, placing the first set of items into the container, and identifying the one or more item types using the association of the container with the one or more item types.

Implementations of the operations may include one or more of the following features. Instructing the replenishment station to move a plurality of the first set of items from the one or more conveyance devices into the first mobile storage unit; counting the plurality of the first set of items moved into the first mobile storage unit by the replenishment station; identifying a second set of items having a second item type, the first set of items being transported to the replenishment station by a first conveyance device of the one or more conveyance devices, the second set of items being transported to the replenishment station by a second conveyance device of the one or more conveyance devices; based on the second item type, instructing the one or more AGVs to transport a second mobile storage unit to a second space of the one or more mobile storage unit spaces, the second mobile storage unit being selected from the plurality of mobile storage units based on the second item type; instructing the replenishment station to move the one or more second items from the second conveyance device into the second mobile storage unit; determining a successful movement of the first item from the one or more conveyance devices into the first mobile storage unit; and responsive to determining the successful movement, instructing the one or more AGVs to transport the first mobile storage unit from the first space at the replenishment station to a storage area.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example and not by way of limitation in the figures of the accompanying drawings in which like reference numerals are used to refer to similar elements.

DESCRIPTION

Figure 1:
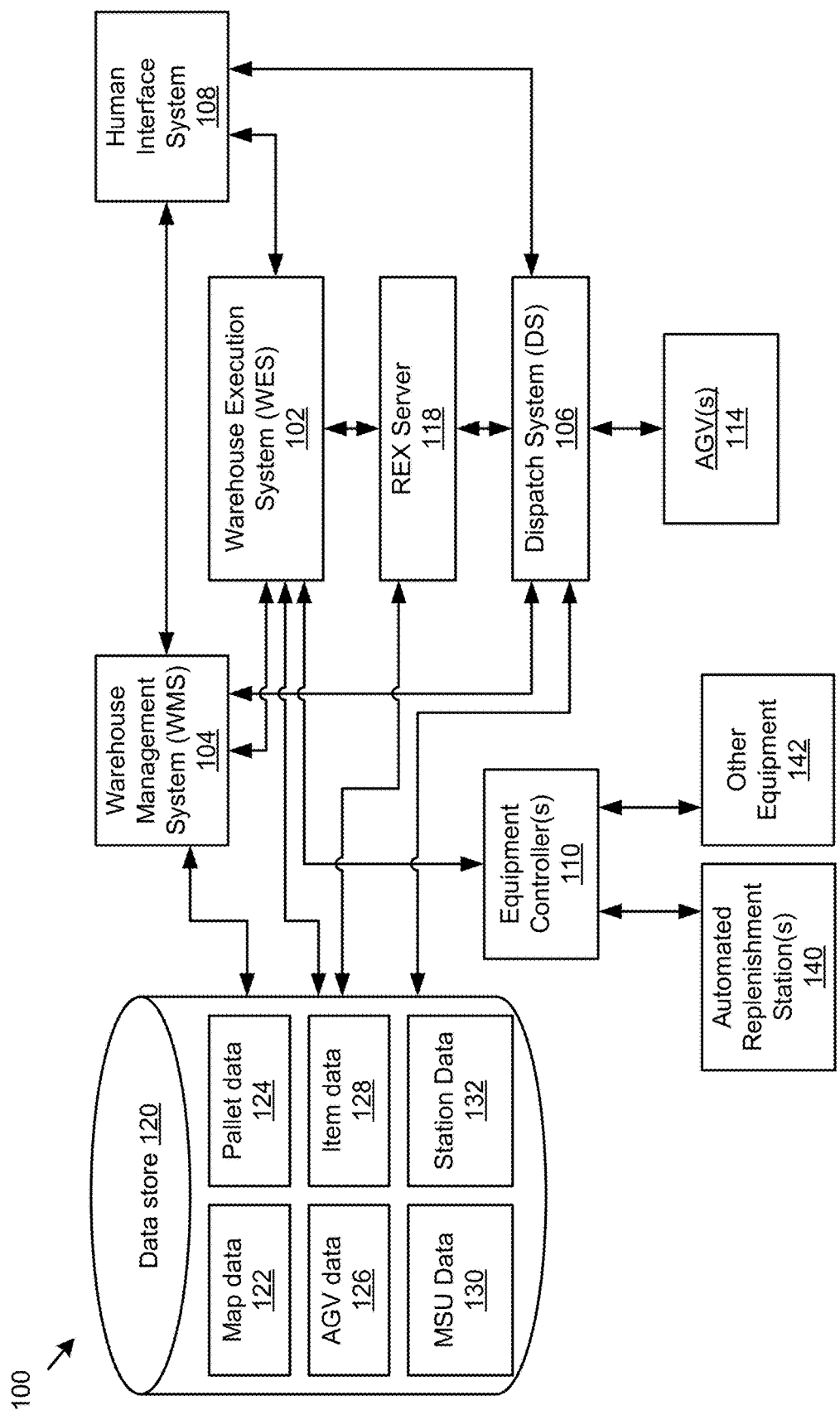
FIG. 1 depicts an example system and data communication flow for implementing an automated robotic replenishment system.

The technology described herein relates to an automated system comprising various software and hardware devices, for example, an automated robotic replenishment system. The technology may include beneficial configurations, operations, features, and interactions. Among other benefits, the technology described herein improves upon that described in the Background Section. For instance, the technology provides robotic devices, systems, methods, and other aspects that can more efficiently process goods (e.g., items or items in a distribution facility).

In some implementations, the technology may use a robotic arm 222 and/or various other devices that efficiently replenish storage units with items. For instance, a fulfillment center may use storage units that hold one or more types of items and from which the items may be picked to fulfill orders, such as by removing items from the storage units and placing them into shipping boxes. When items are picked from the storage units, the storage units are replenished. Similarly, when new items are introduced into a fulfillment center, storage units are stocked with the items.

In some instances, the storage units may be mobile and may be transported by devices, such as automated guided vehicles (AGVs 114) or other robots or machinery. For instance, mobile storage units 224 may be stored in a high-density storage area 208 of a fulfillment center and then transported by AGVs 114 or other devices to a picking station where a human picker may select an item from the mobile storage unit 224 and place it into a shipping carton. Upon completion of the pick, the AGV 114 may transport the mobile storage unit 224 from the picking station back to a storage area 208.

In some implementations, a pallet 226 containing multiple items is received in a fulfillment center and used to replenish mobile storage units 224. The pallet 226 may contain one or many types (e.g., stock keeping units or SKUs) of items, which may replenish one or many mobile storage units 224. The technology automatedly moves items from the pallet 226 into appropriate mobile storage units 224.

For example, according to some implementations of the technology described herein, a pallet 226 of containers of items is brought into a decanting or detrashing area of a fulfillment center by a forklift or pallet jack. In the decanting or detrashing area, a human agent or robot may open the pallet 226, remove a box of items (e.g., a box containing packages of pens) from the pallet 226, and dump the items onto/into a conveyance device 230 that transfers the items to an automated-replenishment station 140. For instance, an agent may dump the items into a tote or container that is transported using a conveyor, robot (e.g., an AGV 114), human (e.g., instructed by a human-machine interface 108), or other device to a robotic replenishment workstation. For example, an automated-replenishment station 140 may use a robotic arm 222 (or other mechanism) with a grasping mechanism to grasp individual items from the conveyance device 230 and place them into mobile storage units 224.

In some implementations, the technology may provide integration, coordination, and control of various systems to intelligently move items and reduce human interaction, which increases speed and accuracy. For instance, the technology may identify a pallet 226 and items on the pallet 226 and, based on the identified items, proactively (e.g., responsive to the identification) instruct that mobile storage units 224 corresponding to items on the pallet 226 be brought (e.g., by AGVs 114) from a storage area 208 to the automated-replenishment station 140. In some instances, there may be more mobile storage units 224 associated with the variety of items on the pallet(s) 226, in which instances the technology may transport the mobile storage units 224 to a staging area 206 nearer to the automated-replenishment station 140 than the storage area 208, so that they can be quickly moved to the automated-replenishment station 140 when they are needed. For instance, the technology may cause AGVs 114 to move mobile storage units 224 between the storage area 208, staging area 206, and/or automated-replenishment station 140, so that the robotic-arm may replenish the mobile storage units 224 as items are available to it (e.g., as items arrive at the station or are placed on conveyance devices 230 to the station).

In some instances, the technology may include various computing devices or controllers coupled with equipment, such as the automated-replenishment station(s) 140, AGV(s) 114, other equipment 142, sensors (e.g., optical sensors, scanners, etc.) human interface system(s) 108, and other devices. In some implementations, the components may communicate with each other directly, for instance, via a network or communication bus. In some implementations, a central control system, such as a warehouse management system (WMS) 104 or other system may receive signals, perform computations, and issue commands to other devices.

These and other technologies described herein provide numerous benefits, such as increasing operating hours, decreasing fatigue, and allowing the technology to scale rapidly, for example, over previous, manual methods. The technology may allow items to be automatically counted (e.g., into one or multiple mobile storage units 224) without a human agent having to manually count them, which is often inaccurate. The technology removes the need for a human agent to find the correct items (e.g., on a pallet) or storage units (e.g., in a storage area 208). For instance, a human agent may dump one or more containers of products from a pallet 226 into a conveyance device 230 or tote that moves items to an automated-replenishment station 140 that counts the items. Similarly, the container, item, or tote may be scanned at the decanting area 204 or automated-replenishment station 140, which allows the WMS 104 to identify the item (and, potentially, all items in the same tote or conveyance device 230) and, based on the identification, coordinate the movement of mobile storage unit(s) 224 and/or items into the mobile storage unit(s) 224.

Features of the technology described herein can be integrated into any logistics system, dispatch system, warehouse execution system, warehouse management system, a robot execution server, etc., to coordinate the operations of various systems, information, and devices in a fulfillment system. The technology described herein may provide a fully or partially automated system that provides redundancy, reduces number of operations, and provides many other benefits described herein. The technology beneficially improves productivity and throughput, increases asset utilization, and lowers cycle time and labor costs. These benefits, in turn, lead to shorter delivery times and result in significant time and resource savings along with reduced error rates.

The technology may, based on an identification of an item, automate numerous operations, such as the coordinated pairing of otherwise un-associated systems thereby providing the noted benefits, among others. The system may include various levels of control, for example, by providing system-level and/or device-level identification, processing, and/or control. It should be noted that these operations are provided as an illustrative example and many other operations and features are within the scope of the present disclosure.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 depicts an example system 100 and data communication flow for implementing an automated robotic replenishment system. The system 100 includes a warehouse execution system (WES) 102. The WES 102 is coupled to equipment controller(s) 110, a warehouse management system (WMS) 104, a data store 120 storing various data, a human interface system 108 (e.g., pick-to-voice, pick-to-light, graphical user interface(s), etc.), a robot execution server (REX) 118, a dispatch system 106, and other systems. For instance, the system 100 may include automated-replenishment station(s) 140 and associated equipment (e.g., sensors, scanners, robotic arms 222, etc.), and/or other equipment 142, such as conveyors, robots, or other devices.

The WES 102 may, in some implementations, include one or more hardware and/or virtual servers programmed to perform operations, acts, and/or functionality described herein. For instance, the components of the WES 102 may comprise software routines storable in one or more non-transitory memory devices and executable by one or more computer processors of the WES 102 to carry out operations, acts, and/or functionality described herein. In further implementations, these routines, or a portion thereof, may be embodied in electrical hardware that is operable to carry out the operations, acts, and/or functionality described herein.

For example, the WES 102 may be communicatively coupled with scanner(s) 142, carton conveyor(s) 144, item conveyor(s) 146, diverter(s) 148, and other equipment 152 either directly or via the equipment controller(s) 110, which may be programmable logic controllers (e.g., conveyor controllers, conveyor scanner controllers, automated induction equipment controllers, other warehouse equipment controllers, or other computing devices for controlling equipment).

In some implementations, the WES 102 may receive, process, and transmit data to control software and hardware interactions, for example, by consolidating and controlling information across systems, as described herein. For instance, the WES 102 may serve as a decision point or control software that processes data streams for receiving data, processing the data, instructing devices, and other computations, as noted herein. For example, the WES 102 may communicate with equipment controller(s) 110 and/or other systems to receive scan data, move items (e.g., using a conveyance device 230), control a robotic arm 222, move mobile storage units 224, or other operations. The WES 102 may divert items and/or boxes into transfer stations 150, initiate the transfer of items into the boxes, and/or control finalizing of the cartons and order. One or more of these operations may be performed via communication with various equipment of the system 100, as described in further detail herein. Accordingly, the WES 102 may provide unified communication that coordinates various systems.

The WES 102 and/or WMS 104 (together or separately) may communicate with various other systems and devices to perform its operations, as described herein, such as equipment controller(s) 110, automated-replenishment stations 140, scanner(s), conveyor(s), and other equipment 142. The WES 102 or WMS 104 may communicate with equipment or a human-interface system 108, which may provide operations for picking items, for instance.

The other equipment 142 may include a station (e.g., where items are placed on a conveyor belt), box erectors, label applicators, scanners, picking equipment, or other devices for inducting or moving items, mobile storage units 224, cartons, or other objects in the system; scanners that may include optical, radio, or other scanners or sensors that scan items, containers, totes, mobile storage units 224, or cartons to identify them; conveyors that may include one or more conveyor belts or other devices that convey objects (e.g., items, mobile storage units 224, cartons, or other objects), for instance, as described herein Other equipment 142 may include various other devices, such as label applicators, carton-closing equipment, control systems, printers, actuators, motors; or various other devices.

The REX server 118 may, in some implementations, include one or more hardware and/or virtual servers programmed to perform operations, acts, and/or functionality described herein. The REX server 118 may generate a schedule that defines the route for an AGV 114. For a given AGV 114, the REX server 118 may generate an AGV 114 schedule and transmit it to the dispatch system 106, which in turn deploys an AGV 114 according to the schedule or instruction, for instance. In some implementations, the dispatch system 106 instructs the AGV 114 to proceed through one or more areas of the distribution facility according to the schedule/instruction. The schedule of each of the AGVs 114 may be coordinated such that an optimal flow can be achieved.

In some implementations, the REX server 118 may include or may communicate with a routing engine, which may route AGVs 114 and/or objects (e.g., items, mobile storage units 224, etc.) in a fulfillment center.

The dispatch system 106 may be electronically communicatively coupled to a plurality of automated guided vehicles (AGVs 114) 114. In some implementations, the dispatch system 106, or elements thereof, may be integrated with or communicatively coupled with the REX server 118. The dispatch system 106 includes hardware and software configured to dispatch the AGVs 114 and is coupled for communication the components of the system 100 to receive instructions and provide data. The dispatch system 106 may calculate a route to execute the task considering traffic and resources. In some cases, it adjusts the route or the task in order to make the route efficient.

The AGVs 114 may be robotic vehicles including drive units providing motive force for moving the AGVs 114 (and, in some instances, items, storage units, etc.), guidance systems for determining position of the AGVs 114 within the distribution facility, and equipment for carrying items. Some AGVs 114 may be attached to, include, or carry carts, which, in turn, carry items or storage units.

The WMS 104 may, in some implementations, include one or more hardware and/or virtual servers or software routines storable in one or more non-transitory memory devices and executable by one or more processors to perform operations, acts, and/or functionality described herein. The WMS 104 may be configured to store and maintain data in the data store 120. In some implementations, the WMS 104 may be configured to communicate with the WES 102, the human interface system 108, dispatch system 106, and/or other systems in real time, in batches, as requested by these components, etc. For example, the WMS 104 may receive data from an e-commerce or other server, process the data, and update various data in the data store 120 based on the order data. Similarly, the WMS 104 may detect and update inventory and other data.

It should be noted that operations described herein in reference to the WMS 104 may be performed by other devices or by other components of the system 100. Similarly, it should be noted that the operations described in reference the WMS 104 and the other components of the system 100 may be distributed or shifted among the components of the system without departing from the scope of this disclosure. For instance, some operations described in reference to the WMS 104 may be performed by the equipment controller(s) 110 or REX server 118, or some operations described in reference to the equipment controller(s) 110, REX server 118, or automated-replenishment station 140 may be performed by the WMS 104 or WES 102.

The human interface system 108 may, in some implementations, include one or more hardware and/or virtual servers or software routines storable in one or more non-transitory memory devices and executable by one or more processors to perform operations, acts, and/or functionality described herein. The human interface system 108 may provide instructions and/or receive data (e.g., scan data, user input, confirmations), for example, from human agents or operators (e.g., using barcode scanners, NFC, RFID or radio-frequency identification chips, or other sensors or input methods), as described in further detail below. An example human interface system 108 may include audio, illumination, or a graphical user interface system that receives inputs and/or provides instructions to human agents. The human interface system 108 may be configured to communicate the pick confirmation data with the WES 102, WMS 104, or other components of the system in real time, in batches, as requested by the components of the system, etc.

The human interface system 108 may receive scan data from a client device based on a user scanning a barcode or other identifier of an item, conveyance device 230, tote, etc. The human interface system 108 may provide instructions to users indicating to place certain items, totes, containers, mobile storage units 224, etc., at certain locations, remedy errors or exceptions, or perform other actions. For instance, the human interface system 108 may instruct a user to dump a container of items into a certain tote/conveyance device 230 for a certain automated-replenishment station 140, remedy an error at an automated-replenishment station 140 or AGV 114, or perform other actions.

The data store 120 is an information source for storing and providing access to data. The data stored by the data store 120 may be organized and queried using various criteria including any type of data stored by it. The data store 120 may include data tables, databases, or other organized collections of data. An example of the types of data stored by the data store 120 may include, but is not limited to map data 122, pallet 226 data 124, AGV 114 data 126, item data 128, MSU (mobile storage unit 224) data 110, station data 132, or other data. In some instances, the data store 120 may also include conveying system attributes, picking data, agent attributes, sensor data, etc.

The data store 120 may be included in the WES 102, WMS 104, REX server 118, or in another computing system and/or storage system distinct from but coupled to or accessible by the WES 102, WMS 104, REX server 118, or other components of the system 100. The WES 102, WMS 104, human interface system 108, REX server 118, and/or dispatch system 106, for example, may store and maintain data in the data store 120. The data store 120 can include one or more non-transitory computer-readable mediums for storing the data. In some implementations, the data store 120 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The map data 122 may include data reflecting the 2- or 3-dimensional layout of the facility including example locations of storage units, automated-replenishment stations 140, container receiving areas/spaces, mobile storage unit 224 receiving area/spaces, staging area(s) 206, equipment, storage shelving units, items, AGVs 114, conveyors, etc. Map data 122 may indicate the attributes of the distribution facility, including attributes of zones/areas of a warehouse. For example, attributes of zones may include the number, quantity, and location of shelving units or bays, storage units, items, guidance system locators or markers, etc.

The pallet data 124 may include data about pallets 226 in or inbound to a fulfillment center. For instance, a pallet 226 may have an identification number and attributes, such as the items or item types on that pallet 226, an identification marker (e.g., a barcode, QR™ code, RFID tag, etc.) by which the pallet 226 may be identified using a scan or other input, its location, priority, size, or other information.

The AGV data 126 may describe the state of an AGV 114, such as operational state, health, location, battery life, storage capacity, objects (e.g., items, mobile storage units 224, totes, pallets, etc.) being carried, cartons, whether a picker is assigned to it, etc.

The item data 128 may describe items in a distribution facility. The item data 128 may include unique identifiers for these items, the item volume (e.g., the total amount picked in given window (e.g., in an hour, day, etc.)), the item velocity (e.g., number of different times item picked in given window (e.g., per hour, day etc.), the location of the items within the distribution facility (aisle, shelf, shelf position, mobile storage unit 224, mobile storage unit partition, tote, conveyance device 230, pallet 226, etc.), other attributes of the item (e.g., size, description, weight, quantity of items in a package, color, quantity of packages in a container, etc.), item inventory, or mapping of items to storage units, orders, conveyor locations, automated-replenishment stations 140, pallets 226, totes, etc. In some implementations, the item data 128 may include the quantity of particular items a storage unit contains, the current location of a storage unit, a storage location of items and/or storage units, and other data. For instance, the item data 128 may include visual aspects, labels, QR codes, identifying markers, etc., that may be used by the WES 102, WMS 104, or equipment controller(s) 110, etc., to identify items, for example, based on a scan of an item.

The MSU data 130 may include information about mobile storage units 224 and/or containers in the system, such as a unique identifier or license plate number for each mobile storage unit 224 or container, a mobile storage unit 224 or container type, the zones a mobile storage unit 224 will visit, the current or assigned location of a mobile storage unit 224, and the priority for the mobile storage unit 224. The MSU data 130 may include a list indicating the items, item types, and/or the quantity of items a mobile storage unit 224 (or a partition thereof) contains or should contain (e.g., it's maximum or assigned capacity). The MSU data 130 may include size or configuration of a mobile storage unit 224, associated automated-replenishment station 140, or other details.

The automated-replenishment station data 134 may include various data pertaining to the automated-replenishment station(s) 140, such as the state of each station, such as its location, speed, operational state, health, capacity, attributes, item(s) in or assigned to the automated-replenishment station 140, instruction(s) assigned to the automated-replenishment station 140, totes or conveyance devices 230 in or assigned to the automated-replenishment station 140, mobile storage units 224 in or assigned to the automated-replenishment station 140, or other data. For instance, the automated-replenishment station data 134 may be automatically updated by the WES 102, WMS 104, equipment controller(s) 110, or a computing device of the automated-replenishment station 140. The automated-replenishment station data 134 may indicate the location of totes, conveyance devices 230, items, mobile storage units 224, or other aspect of the station, a current operation of the robotic-arm, or other data.

The components of the system 100 may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth, NFC, etc.), etc. In some implementations, one or more of these components may be coupled via a data communications bus.

Figure 2:
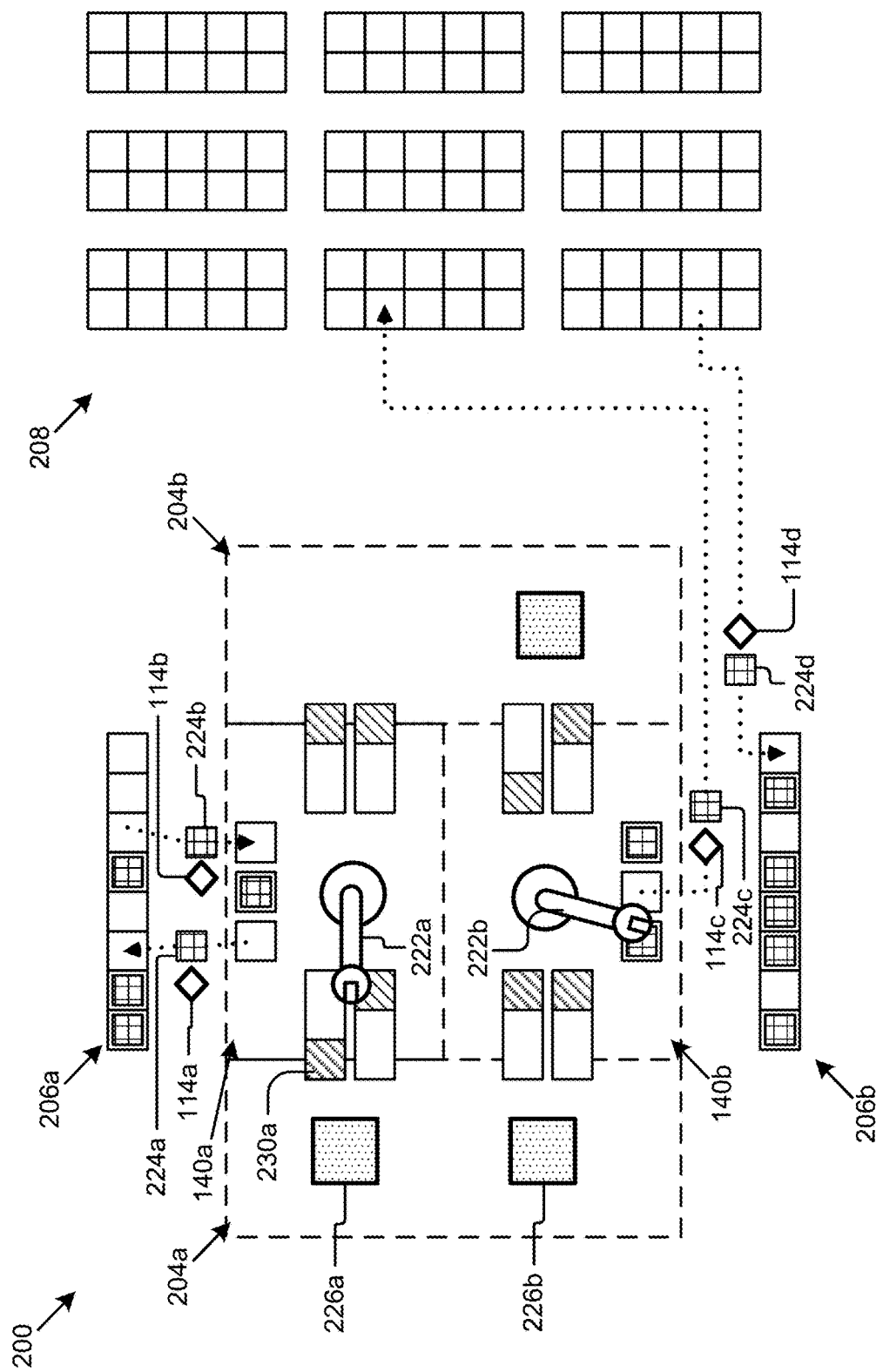
FIG. 2 depicts a schematic of an example configuration of a distribution facility.

FIG. 2 illustrates an example layout 200 of a portion of a fulfillment center used in the automated robotic-arm replenishment system. It should be understood that various facilities may include different configurations. For instance, a fulfillment center, distribution facility, or other location may use some or all of the aspects of the example layout to replenish the stock of mobile storage units 224. For example, the example layout may be used to bring products/items and storage units to a central location, match them, and coordinate operations across several devices. It should be noted that other configurations, components, or layouts are possible and contemplated herein, and the example of FIG. 2 is provided by way of illustration.

The example layout and components of FIG. 2 may allow automated operations, as described in further detail below. Example features of the layout provide various benefits, for example, multiple automated-replenishment stations 140 may be used in parallel to improve throughput. The WMS 104 may use multiple parallel processes and/or equipment to intelligently schedule, spit, and coordinate tasks. A staging area(s) 206 increases readiness and decreases downtime for any given robotic arm 222 or other device. Similarly, an automated-replenishment station 140 may be configured with multiple areas for receiving items and mobile storage units 224 to allow it to transfer multiple item types, replenish multiple mobile storage units 224, and/or further decrease downtime, for instance. It should be noted that although automated-replenishment stations 140 are described herein as using robotic arms 222, other mechanisms are possible and contemplated, such as other robotic devices, sorters, diverters, or other mechanisms that sort incoming items into storage units.

Depending on the implementation, the example layout may include one or more automated-replenishment stations 140a and 140b, decanting areas 204a and 204b, staging areas 206a and 206b, and/or storage area(s) 208. It should be noted that although certain numbers or configurations of these components are illustrated, additional, fewer, or different components are possible and contemplated.

In some implementations, an automated-replenishment station 140 may include one or more container receiving areas or conveyance devices 230 for transporting items, one or more mobile storage unit 224 receiving spaces for receiving mobile storage units 224, and a robotic arm 222 or other robotic sorting equipment. The automated-replenishment station 140 and its components are described in further detail elsewhere herein, for example, in reference to FIGS. 3A-3D. The robotic arm 222 may be adapted to pick up or otherwise move (e.g., by conveyor and sorter) one or more items from the container(s) in the container receiving area(s) or other conveyance devices 230, move the item(s), and place the one or more items into one or more mobile storage units 224 in the one or more mobile storage unit spaces. For instance, a robotic arm 222 may include a suction or grasping mechanism that grasps items.

The automated-replenishment station 140 may be controlled by an equipment controller 110 or may have its own computing unit that receives instructions (e.g., from the WES 102, WMS 104, or equipment controller 110) instructing the robotic arm 222 to perform certain tasks (e.g., move an item(s) from a defined tote to a defined storage unit), in response, determines the specific movements or operations for the robotic arm 222 or other components of the station. The automated-replenishment station 140 may include sensors, scanners, or other inputs that identify or detect totes, items, mobile storage units 224, etc., which may communicate with the automated-replenishment station 140's computing unit or another component of the system 100, for instance, as described herein.

FIG. 2 illustrates example movements of robotic arms 222a and 222b. For instance, a first robotic arm 222a is illustrated retrieving an item from a tote or conveyance device 230 and a second robotic arm 222b is illustrated placing an item into a mobile storage unit 224 in a mobile storage unit 224 receiving space of the automated-replenishment station 140b.

As illustrated in the example of FIG. 2, one, two, three, or more automated-replenishment stations 140 may be located adjacent to one another, so that a single human agent may monitor and interact with multiple stations, for example, a single human agent may be in a decanting area 204a in which the agent unpacks pallets 226 and dumps them into containers/totes that are conveyed to the automated-replenishment station(s) 140. Although a human may dump and/or transport the items or totes to the automated-replenishment station 140, an AGV 114 or robot may perform these operations. In some implementations, a robotic-arm in an automated-replenishment station 140 may be configured to unpack a pallet 226 and/or packages of items (e.g., on a pallet 226). For instance, an entire pallet 226 or an entire package of items may be transported to an automated-replenishment station 140, so that items therein/thereon may be moved to mobile storage units 224 by the robotic arm 222.

Additional details, examples, and implementations of a robotic-station are described in reference to FIGS. 3A-3D.

In some implementations, the layout 200 may include a decanting or detrashing (e.g., pallets 226 or packing materials may be disposed of in this area) area 204, which may receive pallets 226a ... 226b on which individual items or packages of items (e.g., a package filled with pens or printer cartridges) may be stored or transported. In the decanting area 204, a human agent or robot may remove items or packages of items from the pallet 226 and place the items onto a conveyance device 230. For example, in the decanting area 204, the agent may open a package of items, dump the package into a tote, scan a single item or the package, scan the tote, and/or push the tote toward a robotic arm 222 in an automated-replenishment station 140. The decanting area 204 may overlap, be adjacent to, or be separate located from automated-replenishment station(s) 140.

For example, a conveyance device 230 may include more containers (e.g., containers or totes 312 illustrated in FIGS. 3A-3D) or tote that are adapted to hold one or more items. The containers may be transported by container transportation/conveyance devices 230 adapted to transport the one or more containers to one or more container receiving areas of one or more automated-replenishment stations 140. The container transportation or conveyance devices 230 may include rollers, rails, robots, AGVs 114, conveyor belts, etc. For example, although sliding a tote filled with items to an automated-replenishment station 140 (e.g., on rollers or conveyors) is described as an example, other conveyance devices 230 or methods of transporting the items to automated-replenishment stations 140 may be used, such as AGVs 114, robots, conveyor belts, or other devices.

In some implementations, the decanting area 204 and/or a client computing device (e.g., coupled with the human-machine interface system 108) may include or be coupled with a scanner or other input that identifies the pallet 226, package, item, tote (e.g., 312), conveyance device 230, agent, and/or automated-replenishment station 140. For instance, a scanner may be communicatively coupled with a component of the system 100, which captures an identification (e.g., marker, bar code, QR™ code, etc.) of a pallet 226 and, based on the scan data, the system 100 may instruct an AGV 114 to transport one or more storage units corresponding to identified items to an automated-replenishment station 140 or staging area 206 associated with the automated-replenishment station 140. For instance, as described below, the WES 102 may proactively transport mobile storage units 224 for items on a pallet 226 to a staging area 206 based on the identification of the pallet 226.

In some implementations, the example layout 200 of the fulfillment center may include an example a storage area 208 for storing mobile storage units 224. For instance, the storage area 208 may be a long-term and/or high-density storage area 208 in which mobile storage units 224 are stored, for example, on shelves from which or on which an AGV 114 may retrieve the mobile storage unit(s) 224. The shelves may vertically store multiple mobile storage units 224. The storage area 208 may be located away from the automated-replenishment stations 140, for example, and closer to a picking area of the fulfillment center. Various sizes, locations, and configurations of the storage area 208 are possible and contemplated.

In some implementations, the example layout 200 of the fulfillment center may include an example a staging area 206 for temporarily storing mobile storage units 224. The staging area 206 may include separate storage locations for mobile storage units 224 from the storage area 208. For instance, a staging area 206 may be separate from and/or located closer to an automated-replenishment station 140 and include fewer storage locations (e.g., places, stands, or shelves) for mobile storage units 224 than the storage area 208. A fulfillment center may include one or multiple staging areas 206a . . . 206b for one or multiple automated-replenishment stations 140a . . . 140b. For instance, a staging area 206 may serve multiple automated-replenishment stations 140.

For instance, a staging area 206 may include spaces (e.g., shelves, holders, etc.) sixty or another quantity of mobile storage units 224 to act as a buffer between the long-term storage area 208 and the mobile storage unit 224 receiving spaces of one or more automated-replenishment stations 140. The quantity of mobile storage unit spaces in a staging area 206 may be set based on a typical quantity of types of items receiving on a pallet in a fulfillment center. Accordingly, empty or unassigned mobile storage units 224 or mobile storage units 224 that need to be replenished and are associated with items in a pallet 226 (or tote being conveyed to an automated-replenishment station 140) may be placed in the staging area 206, so that they can quickly be moved to/from a space in an automated-replenishment station 140.

A mobile storage unit 224 may be a container, pallet, mini pallet, shelf, shelving unit, or other device for storing and/or carrying items. An example implementation of a mobile storage unit 224 is illustrated and described in reference to FIG. 5. A mobile storage unit 224 may be unassigned, may have a single item type assigned to it, or may have multiple item types assigned/stored therein. In some instances, multiple item types may be stored together in a single mobile storage unit 224 or a single mobile storage unit 224 may have multiple compartments that are separately assignable to different item types. As noted above, MSU data 130 may indicate a current location of a mobile storage unit 224, an assigned location to which the mobile storage unit 224 should be brought, one or more item types assigned to the mobile storage unit 224 and/or it's individual compartments, a current quantity of items in the mobile storage unit 224, a maximum capacity of an assigned item type in the mobile storage unit 224, or other data. For instance, as items are picked from a mobile storage unit 224, its inventory may be decreased in a file or table in the data store 120.

The WMS 104 may automatically order an item when total inventory in the storage area 208 or a mobile storage unit 224 falls below a threshold. When a pallet 226 of items is received, the WES 102 or WMS 104 may identify that the pallet 226 includes the item, identify that the item is eligible for robotic-arm replenishment, determine one or more mobile storage units 224 for replenishment, determine the current location of the mobile storage unit(s) 224, and instruct AGVs 114 to move the mobile storage units 224, such as to a staging area 206.

An automated guided vehicle (AGV) 114 may include a motorized device adapted to move objects, such as totes or mobile storage units 224 between mobile storage unit receiving spaces of an automated-replenishment station 140, staging area 206, storage area 208, and/or other areas in a fulfillment center. For instance, an AGV 114 may include a guidance device, processing and communication unit(s), motors providing motive force to the AGV 114, and components, such as a robotic arm 222, lift fork, lifting surface, or other device that picks up, transports, and places mobile storage units 224. Example implementations of an AGV 114 are illustrated in reference to FIGS. 4A-4C.

FIG. 2 also illustrates various example movements of mobile storage units 224. For example, AGV 114a is illustrated moving mobile storage unit 224a from a space in an automated-replenishment station 140a to a space in a staging area 206a. For example, this scenario may occur when additional items from a pallet 226 are determined (e.g., by the WMS 104) to be picked to the mobile storage unit 224a at a later time.

AGV 114b is illustrated moving mobile storage unit 224b from a space in a staging area 206a to a space at an automated-replenishment station 140a. For example, this scenario may occur when the mobile storage unit 224b had been brought to the staging area 206 responsive to a scan of a pallet 226a (e.g., indicating that the mobile storage unit 224b may be replenished with an item on the pallet 226a). Based on a set of the item being placed in a conveyance device 230a and/or otherwise moved (e.g., based on a scan identifying the item), the AGV 114b may move the mobile storage unit 224b from the staging area 206a to the automated-replenishment station 140a.

AGV 114c is illustrated moving mobile storage unit 224c from a space in an automated-replenishment station 140b to a shelf in a storage area 208. For example, this scenario may occur when the mobile storage unit 224c has been replenished (e.g., to its capacity or with all items assigned to the mobile storage unit 224c from the pallet(s) 226). For instance, responsive to a count by the automated-replenishment station 140b reaching the capacity of the mobile storage unit 224c, the equipment controller(s) 110 or WMS 104 may send a signal (e.g., via the REX server 118) to the AGV 114c instructing the AGV 114c to move it from the space at the automated-replenishment station 140b and transport it to a defined space at the storage area 208.

AGV 114d is illustrated moving mobile storage unit 224d from the storage area 208 to a space in a staging area 206b. For example, this scenario may occur when a pallet 226b is identified (e.g., based on a scan of a marker on the pallet 226b) and the WMS 104 determines that an item assigned to the mobile storage unit 224d is on the identified pallet 226b (e.g., based on a file associated with the pallet 226b). The WMS 104 may determine that the mobile storage unit 224d has a current inventory lower than a threshold and, in response, instruct an AGV 114d (e.g., via the REX server 118) to move the mobile storage unit 224d to a staging area 206b, so that it can be quickly moved to the automated-replenishment station 140b when the assigned items are transferred to the automated-replenishment station 140 or at another defined time.

It should be noted that while certain movements, interactions, paths, locations, and devices are illustrated, other implementations are possible and contemplated herein. The examples of FIG. 2 are provided as illustrative examples.

Figure 3A:
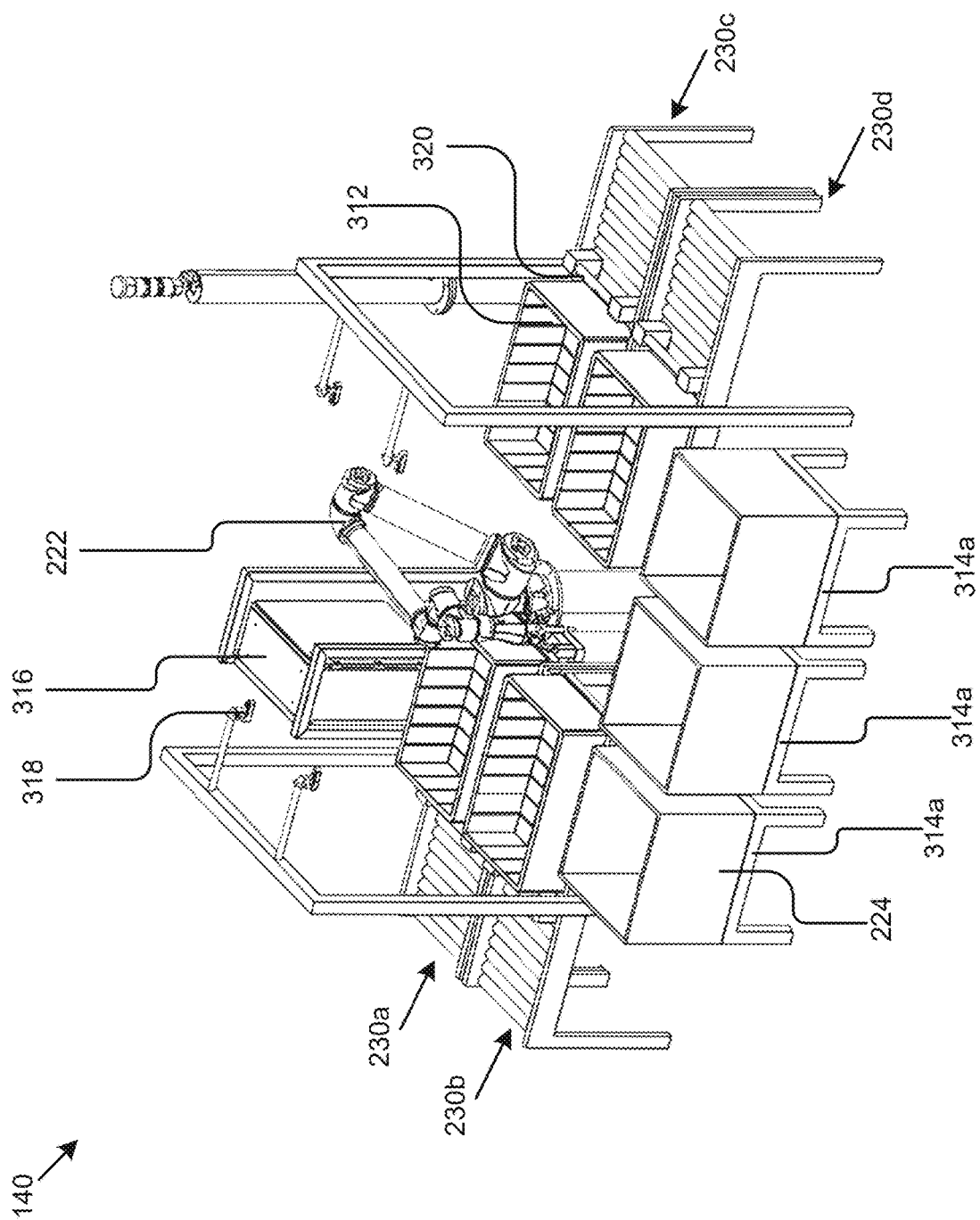
FIGS. 3A-3D illustrate example implementations of automated-replenishment stations.
Figure 3B:
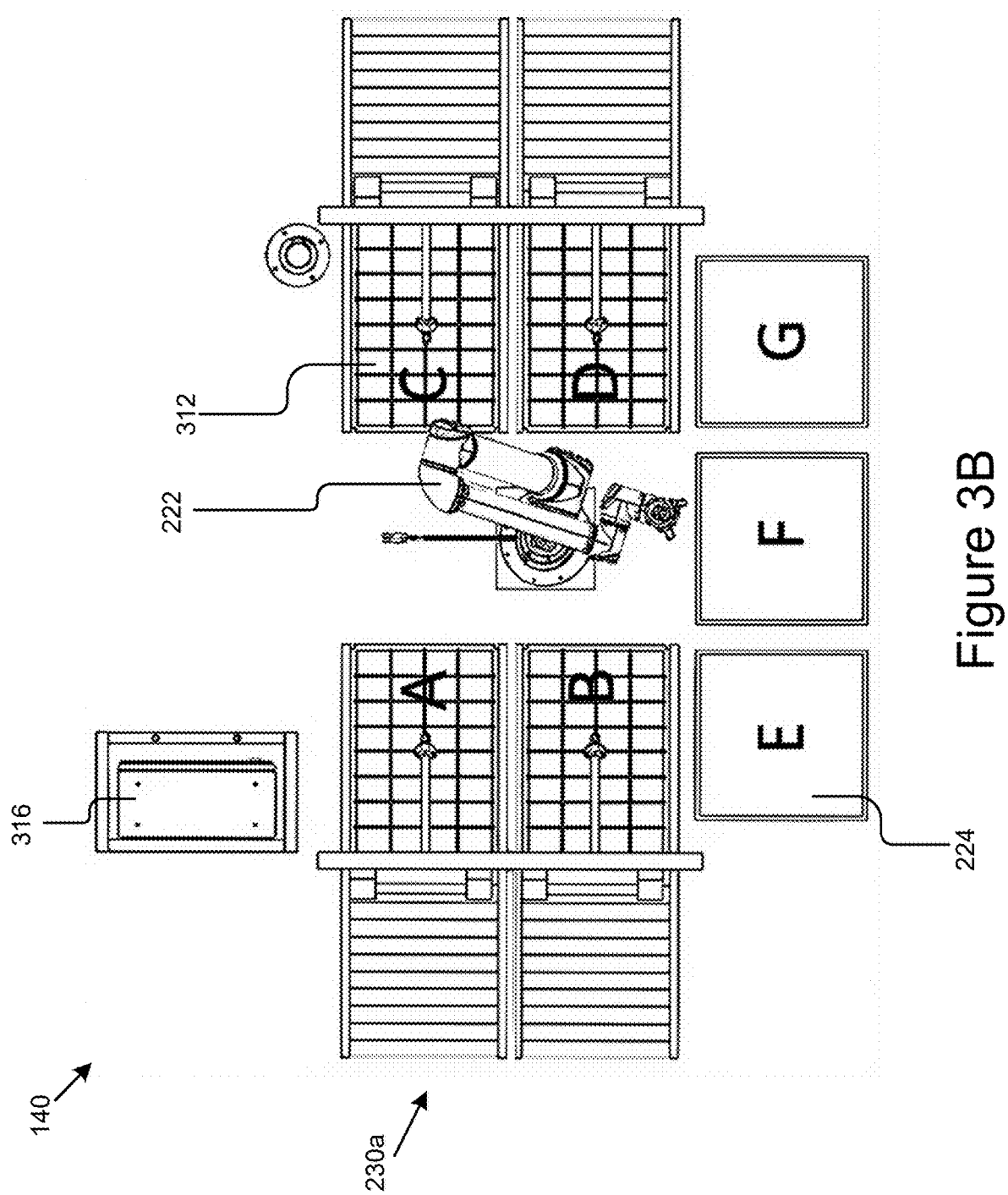
Figure 3C:
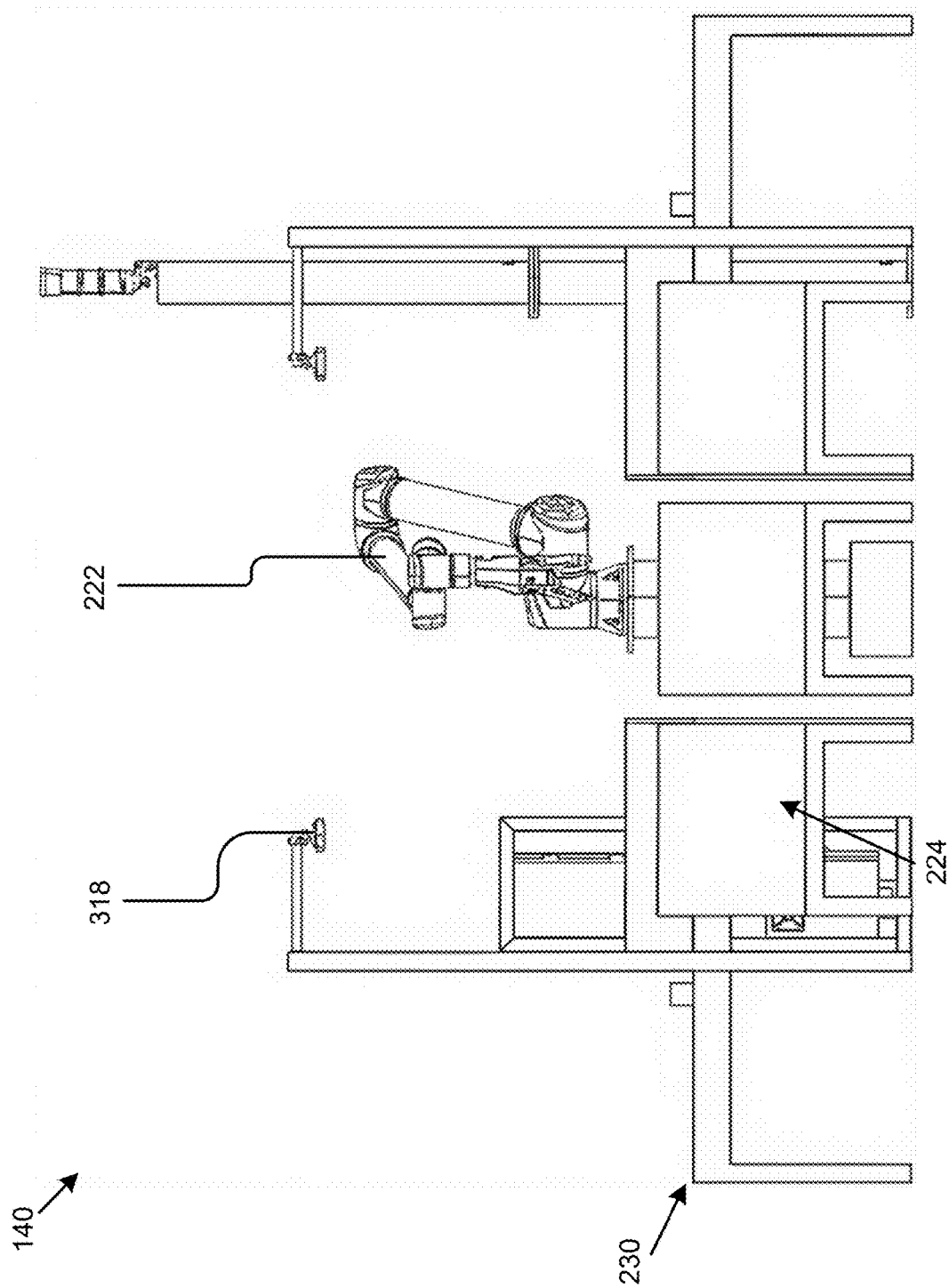
Figure 3D:
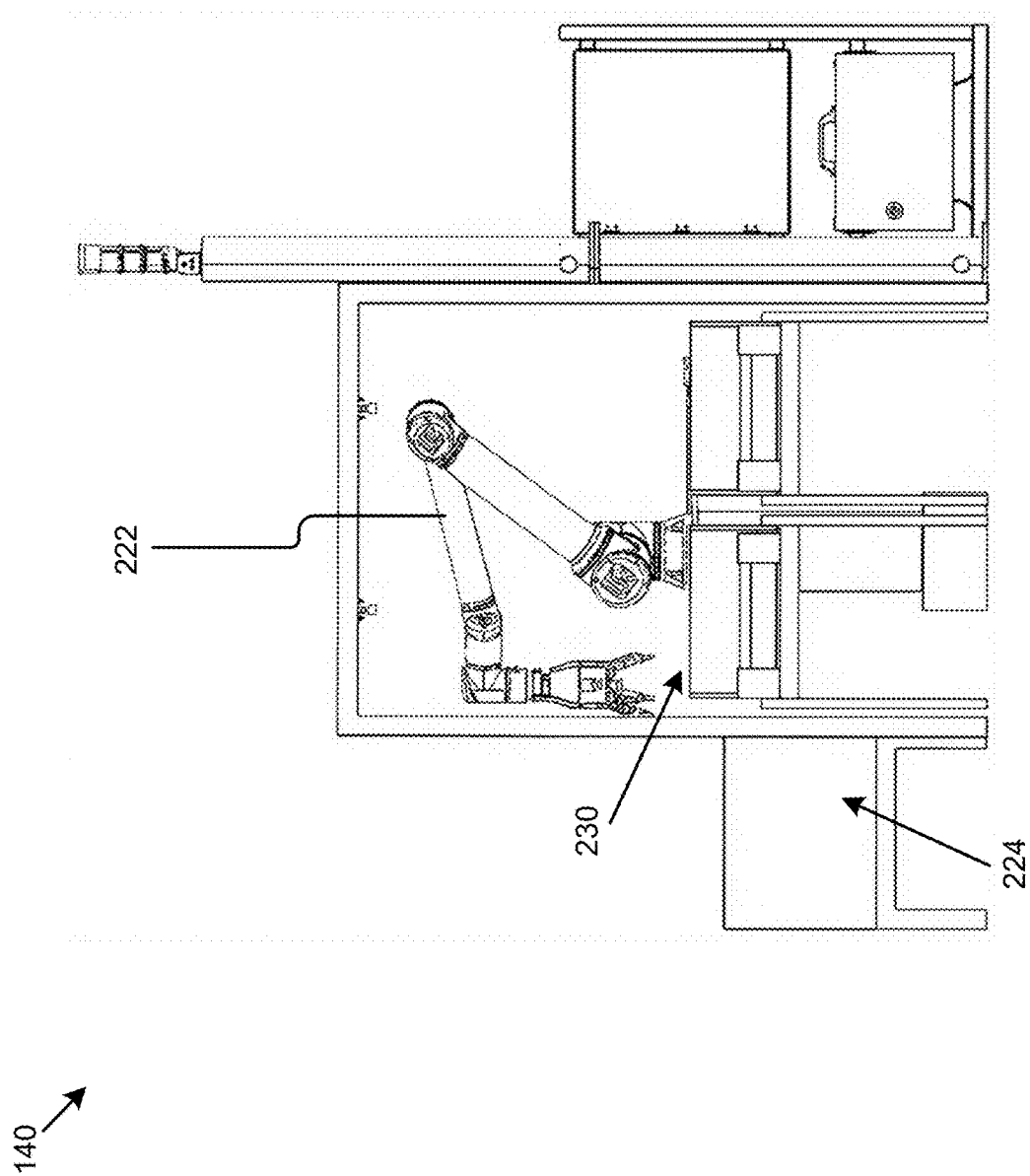

FIGS. 3A-3D illustrate example implementations of automated-replenishment stations 140. For example, FIG. 3A illustrates a perspective view, FIG. 3B illustrates a top-down view, FIG. 3C illustrates a front view, and FIG. 3D illustrates a side view of an example automated-replenishment station 140.

Although other configurations are possible, an illustrated example configuration is provided. For example, as illustrated, the automated-replenishment station 140 may include multiple conveyance devices 230a, 230b, 230c, and 230d for transferring items to the station and multiple spaces for receiving mobile storage unit(s) 224. For example, the automated-replenishment station 140 may include a robotic arm 222 mounted near a center with one or multiple (e.g., 2, 3, or 4, depending on the implementation) conveyance devices 230 along one or more sides. For instance, as illustrated, the example automated-replenishment station 140 includes two container (e.g., where an item conveyance device 230 includes a container moved to the automated-replenishment station 140) receiving areas (e.g., at a side of conveyance devices 230a and 230b proximate to a robotic arm 222) along a first side and two additional container receiving areas (e.g., at a side of conveyance devices 230c and 230d proximate to a robotic arm 222) on a second, opposing side.

The example implementation of the automated-replenishment station 140 also illustrates three spaces 314a, 314b, and 314c for mobile storage units 224 along a third side. For example, the third side may be perpendicular to the side(s) where the container receiving areas/conveyance devices 230 are located to reduce movement of the robotic arm 222, although other implementations are possible. For instance, a mobile storage unit space 314 may be immediately adjacent to a container receiving area to reduce movement. Similarly, the components may be positioned circularly, in other orientations, in other quantities, or other configurations. Depending on the implementation, a space 314 may include a designated location (e.g., in the map data 122), a shelf, a stand, or another spot for a mobile storage unit 224.

Due to the relatively compact and modular nature of the example automated-replenishment station 140, it may be multiplied in a fulfillment center, so that replenishment of items may be handled in parallel, for example, by scheduling tasks (e.g., by AGVs 114 and human agents) across multiple stations using the WMS 104, WES 102, or other component of the system 100.

Other devices may also be present in, near, or associated with the automated-replenishment station 140. For instance, the automated-replenishment station 140 may have a computing device 316 controlling its operations (e.g., an equipment controller 110 or other computer), one or more scanners 318 coupled with the computing device, power sources, communication links, sensors, and other devices. For instance, scanner(s) 318 may be positioned above the conveyance device(s) 230 or container receiving area(s) and used to identify containers and/or items being transferred or already transferred to the automated-replenishment station 140. A scanner 318 may be an optical device that recognizes objects (e.g., items, totes, containers, etc.) based on their visual attributes, a barcode reader that identifies bar codes on objects, an RFID reader that reads RFID tags on objects, or otherwise. The computing device 316 of the automated-replenishment station 140 may send identification or scan information to the WES 102 or WMS 104, which may then identify the item or the presence of an item, and, based on the data, instruct an AGV 114 to move a mobile storage unit 224 from the storage area 208 or staging area 206 and/or instruct the robotic arm 222 to move the identified items and/or items from the identified location (e.g., tote/container or conveyance device 230) to a defined mobile storage unit 224.

A robotic arm 222 may be an off the shelf or dedicated robotic arm 222 or other device that can automatically articulate to move items in response to instructions or signals from a computing device. For instance, the robotic arm 222 may include an off the shelf industrial arm (such as provided by RightHand Robotics™, Vention™, or Universal Robots™) mounted to a chassis with a gripper or suction cup for grasping items. In some implementations, the robotic arm 222 may include vision and machine learning software, smart grippers that provide feedback on grasp success and ensure pick accuracy. The automated-replenishment station 140 may also include various off the shelf items, such as cameras (e.g., an Intel RealSense™ camera, etc.), power distribution units, CPUs, safety control units, emergency stop buttons, human-machine interface devices, pneumatic panels, enclosures, or other mechanisms.

Although a robotic arm 222 is described and illustrated in reference to FIGS. 3A-3D, other mechanisms for transferring items from a source (e.g., a conveyance device 230) to a target (e.g., a mobile storage unit 224). For example, a conveyor belt and diverter, another robot, robotic crane, or other device may be used.

The automated-replenishment station 140 may include a conveyance device 230 that transports items (e.g., from a decanting area 204) to an automated-replenishment station 140, such as a conveyor belt, AGV 114, or container on rollers. For instance, in the illustrated implementation, a conveyance device 230 may include one or more containers and container transportation devices. A container may hold items and be transported by a conveyor belt, AGV 114, or other device, such as rollers. For example, a container transportation device may include a horizontal sliding mechanism supporting the container and allowing the container to slide between a decanting area 204 and a container receiving area of the automated-replenishment station 140. For instance, the sliding mechanism may include rollers, wheels, and/or rails via which a container may move to the automated-replenishment station 140. For instance, a tote/container may be mounted on rollers to slide back and forth between a decanting area 204 and an automated-replenishment station 140. Although the rollers are illustrated as being short and straight, they may curve or move in any direction to allow the container(s) to move to one or more automated-replenishment stations 140 based on their locations or other configurations.

In some implementations, the conveyance device(s) 230 or container transportation device(s) may be motorized, gravity and/or spring fed, or moved by a human or robot. For example, a container transportation device may include a handle 320 coupled to the device and/or container/tote 312 that allows an agent to push or pull the container horizontally on the horizontal sliding mechanism when force is applied to the handle 320. Accordingly, as an example, a human agent may dump one or more packages of items into a container 312 (e.g., so the container only includes a single type of item, but the agent does not need to count the items) and then push the container 314 toward the robotic arm 222 in an automated-replenishment station 140. For purposes of identification of the item, as discussed elsewhere herein and depending on the implementation, the item(s) and/or container 314 may be identified based on user input (e.g., into a client device coupled with the human-interface system 108) or a scan of the item(s) or container(s). For instance, the item may be scanned when placed into the container 314 (and the container may also be associated with the identified item) or when the container past or under a scanner in the automated-replenishment station 140.

In some implementations, the automated-replenishment station 140 may include one or multiple spaces for receiving mobile storage units 224, for example located along a side of the robotic arm 222 and adjacent to the conveyance device(s) 230. For instance, the automated-replenishment station 140 may include multiple spaces 314 to allow flexibility in timing when moving items between the conveyance devices 230 and the mobile storage units 224. Similarly, a mobile storage unit 224 may be moved to or from the automated-replenishment station 140 while another mobile storage unit 224 is receiving is receiving items from the robotic arm 222. In some implementations, a mobile storage unit 224 may be set on a floor, shelf, stand, rail, or other structure for holding the mobile storage unit 224 at an efficient height for access by the robotic arm 222 and/or AGV 114.

In some implementations, a computing device 316 may be present in or connected with the automated-replenishment station 140 and may communicate with the WES 102, WMS 104, equipment controller 110, or other components of the system 100, as described elsewhere herein. For instance, the computing device 316 may receive instructions, send task confirmation messages, scan barcodes or other markers, determine and report system health or errors, handle exceptions, control the robotic arm 222, interface with sensors, provide or interface with the human interface system 108, communicate with sorters or conveyors, communicate with AGVs 114, or perform other computer operations. For instance, the station's computing device may communicate via JSON (JavaScript Object Notation) over a TCP (Transmission Control Protocol) socket or another protocol with other components of the system 100 to perform the operations herein.

Figure 4A:
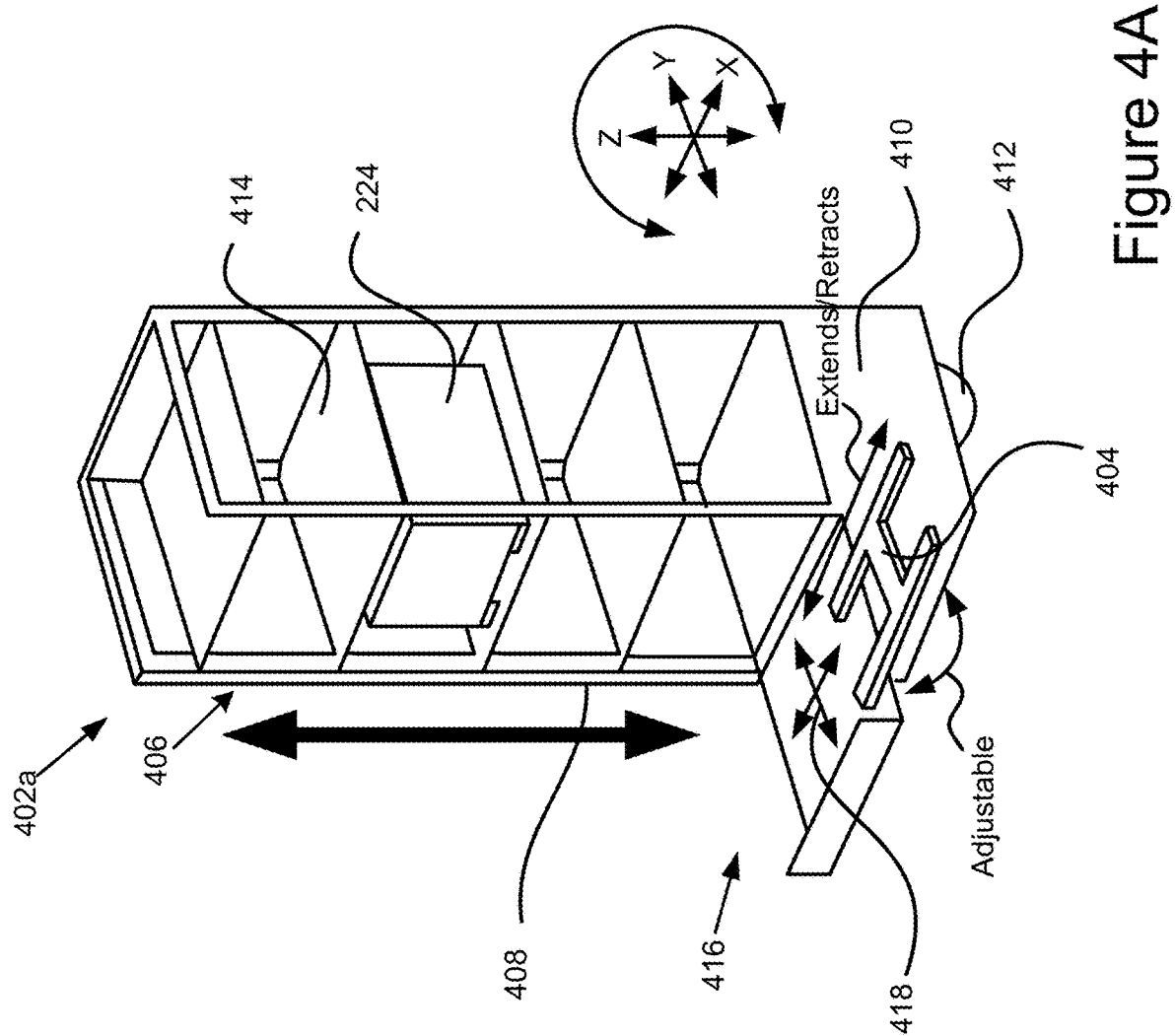
FIGS. 4A-4C are illustrations of example automated guided vehicles.
Figure 4B:
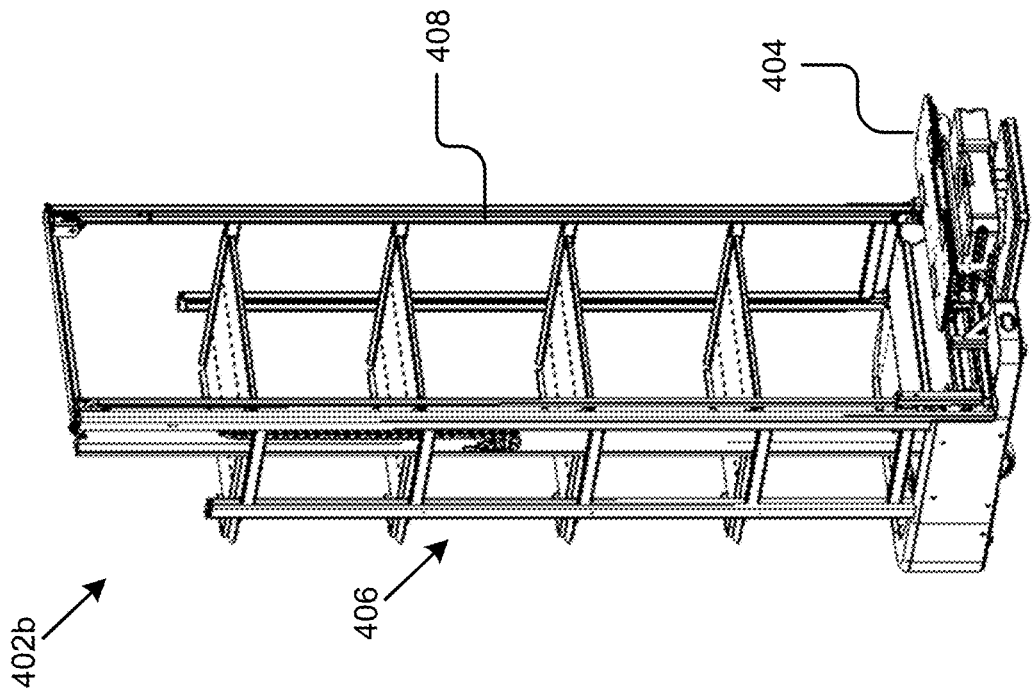
Figure 4C:
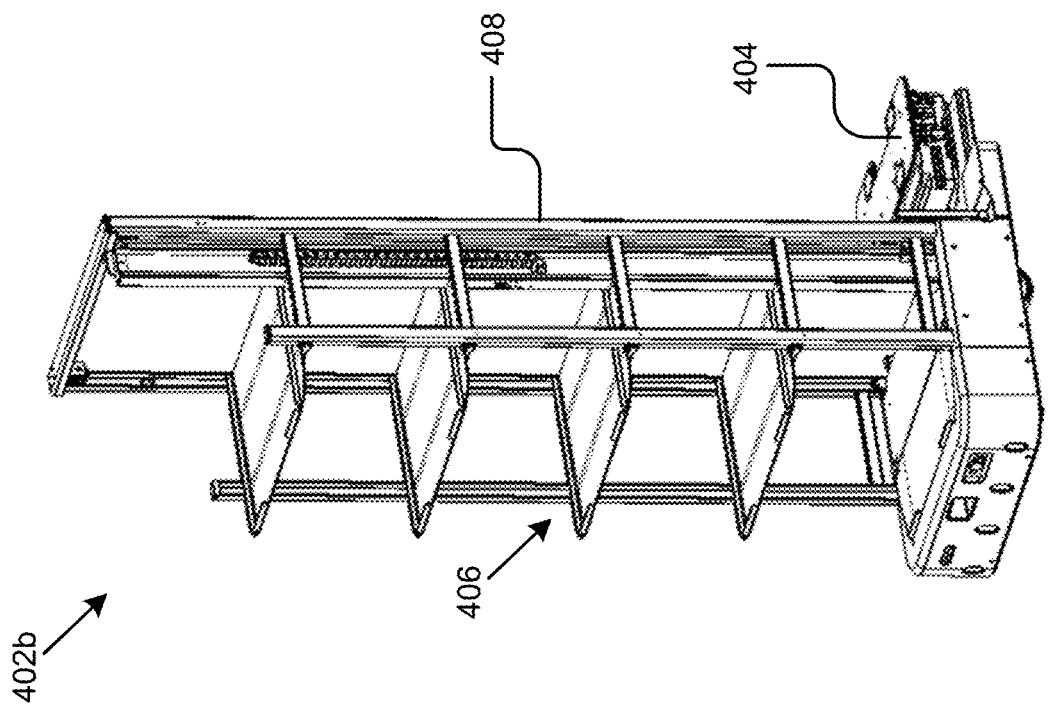

FIGS. 4A-4C are illustrations of example AGVs 402a and 402b (the AGVs 402 are example implementations of the AGV 114 described elsewhere herein). The example AGVs 402a and 402b may reach and retrieve different sizes of mobile storage units 224 (e.g., pallets, totes, cartons, or other items, etc.) from different levels of storage shelves using a handling mechanism 416 and a carrying surface 404. It should be noted that while example AGVs 402a and 402b are provided, there are many different potential configurations of automated guided vehicles, robots, or other methods of moving mobile storage units 224.

FIG. 4A depicts an example AGV 402a, which may include an AGV 114 body 410, a drive unit 412 housed within or coupled to the body 410, a power source (not shown) housed within or coupled to the body 410, an AGV 114 storage rack 406 with one or more AGV 114 shelves 414, a handling mechanism 416, a carrying surface 404, a guidance system (not shown), and one or more controllers (not shown), although other configurations are possible and contemplated herein. For instance, the example AGV 402b may include one or more of the components described in reference to the AGV 402a and/or the AGV 402a may include one or more of the components described in reference to AGV 402a.

The body 410 may include a front, a rear opposing the front, a left side extending from the front to the rear, and a right side opposing the left side and extending from the front to the rear. While various shapes and construction materials to the body 410 are possible, the body 410 may be configured to fit between rows of storage shelving in a high-density storage area 208. The body 410 may be configured to house a drive unit 412, power source, controller, and/or other components of the AGV 402a.

The drive unit 412 may be coupled to the body 410 and configured to receive power from the power source to provide motive force to the AGV 402a and propel the AGV 402a within an operating environment. In some implementations, the drive unit 412 may receive instructions from one or more controllers instructing the drive unit 412 to cause the AGV 402a to move forward, backward, sideways, turn, or perform another movement. In some implementations, the drive unit 412 may include electric motors and wheels, although other configurations, such as treads are possible.

The drive unit 412 may be wirelessly coupled via a controller to a wireless interface and a wireless communications network to receive control signals from the dispatch system 106 and/or other components of the system 100. In some implementations, the drive unit 412 may be controlled as described in elsewhere herein, which may be executed using a distributed computing system comprising AGVs 114, servers, controllers, etc., for example, as shown in the system depicted in FIG. 1.

The power source may be coupled to the components of the AGV 402a to provide power to the components, for example, the power source may provide power to the handling mechanism 416, the drive unit 412, a controller, or another component of the AGV 402a. The power source may include a battery, a wire, contact track in the operating environment, induction charger, alternator or gas generator, etc.

Some implementations of the AGV 402 may include an AGV 114 storage rack 406 (also referred to as AGV rack 406), such as illustrated coupled with the example AGVs 402a and 402b. While the AGV rack 406 is illustrated as coupled to the top of the body 410, other configurations are possible, for example, the AGV rack 406 may be coupled in front of, behind, to the side of, or even towed or pushed by the AGV 402. The AGV rack 406 may be positioned proximate to the handling mechanism 416, so that the shelves 414 are within reach of the handling mechanism 416 for the handling mechanism 416 to place items on the shelves 414.

The AGV rack 406 may include a single shelf 414 or a plurality of shelves 414 coupled to a frame. The shelves 414 may include flat surfaces, bays, containers, or other mechanisms for holding a mobile storage unit 224 or another item. Depending on the implementation, at least one of the shelves 414, where equipped, is capable of storing the item during transit of the AGV 402a.

The plurality of shelves 414 may be vertically arranged and, in some implementations, one or more of the shelves 414 may have an adjustable height (e.g., adjusted manually or automatically using a motor coupled with the AGV 402a) on the AGV rack 406. In some implementations, a controller of the AGV 402a may determine a current height of a particular shelf of the plurality of shelves 414, for example, using an optical scanner or retrieving a stored height of the particular shelf from a database (e.g., on the data store 120). For example, one or more of the shelves 414 may include a marker readable by an optical scanner coupled with the handling mechanism 416 or carrying surface 404 to indicate to the handling mechanism 416 a location or identification of a particular shelf. In some implementations, a controller of the AGV 402a may store a shelf identifier for a shelf 414 in association with a height or size of the shelf 414, or an identifier of an item or mobile storage unit 224 stored on the shelf 414.

In some implementations, a shelf 414 onto which an item is placed may be selected based on the size, height, weight capacity, or other attributes of the shelf 414. For example, a mobile storage unit 224 of a given size may be placed on a shelf 414 having a corresponding size. In another example, a mobile storage unit 224 having a threshold weight may be placed on a lower shelf 414 of the AGV rack 406 than a mobile storage unit 224 having a lighter weight than the threshold.

The handling mechanism 416 may include an extender for extending a carrying surface 404 from an AGV 402 to a storage shelving unit that is separate from the AGV 402. The handling mechanism 416 may have one, two, three, or more degrees of freedom to move the carrying surface 404 along corresponding axes thereby allowing the handling mechanism 416 to retrieve an item, such as a mobile storage unit 224, from a first target shelving unit using the carrying surface 404 and the degrees of freedom and place the item on a second target shelving unit.

In some implementations, the handling mechanism 416 may include a mast having an elevator 408 coupled with the body 410 and/or AGV rack 406. The elevator 408 lifts and lowers a platform 418 supporting a carrying surface 404. The elevator 408 moves the handling mechanism 416 along a Z axis to lift and set down the carton.

In some implementations, the platform 418 extends or retracts the carrying surface 404 horizontally between the AGV 402a and a storage shelving unit. In some implementations, the platform 418 may also extend or retract the carrying surface 404 into or out of one or more of the AGV 114 shelves 414 to place an item on one of the AGV 114 shelves 414. The handling mechanism 416 includes a moveable platform 418 having a carrying surface 404 capable of translating along a plane in two or more dimensions and/or rotating about a vertical axis. For example, the platform 418 (or other component of the handling mechanism 416, depending on the implementation) may translate the carrying surface 404 along any X and Y coordinates (e.g., sideways/left and right relative to the front of the AGV 402a; forward and backward relative to the front of the AGV 402a; etc.). This allows the handling mechanism 416 to retrieve an item from a storage shelf and move it to and place it on an AGV 114 shelf 414 supported by the frame, and vice versa. The handling mechanism 416 may be adjustable to translate between an X axis, Y axis, a combination, etc.

In some implementations, the platform 418 may comprise two platforms coupled to one another, a first of which moves along a first horizontal axis and a second of which moves along a second horizontal axis perpendicular to the first horizontal axis. For instance, the first platform may be coupled with the elevator 408 and the second platform, so that the first platform may move the second platform along the first horizontal axis. The second platform may be coupled with the first platform and the carrying surface 404, so that the second platform may move the carrying surface 404 along the second horizontal axis.

The handling mechanism 416 may be capable of moving items between the different shelves 414 in the AGV rack 406, shelving units in a high-density storage area 208, one or more pick cells 382 in a pick-cell station 316, and, in some instances, to or from other target shelves (e.g., in an induction area 308, replenishment area 318, etc.).

In some implementations, the AGV 402a may include a scanner coupled with the carrying surface 404, platform 418, etc., that can read signatures or markers to determine location. For example, the scanner may be an optical scanner configured to read visual identifiers (e.g., labels including a QR code, bar code, etc.) to determine which shelf 414 the handling mechanism 416 or the carrying surface 404 is aligned with. The optical scanner may scan a shelf marker on one or more of the AGV 114 shelf 414 or a detached storage shelf. The shelf marker may indicate a position and/or identification code of shelves and/or mobile storage units 224, for example.

In some implementations, the elevator 408 may include positional sensors to determine the position of handling mechanism 416 and/or align the carrying surface 404 with a target shelf (whether an external or integrated with the AGV 402a).

The carrying surface 404 may be coupled to or integrated with the handling mechanism 416 and is configured to support a mobile storage unit 224 or another item. In some implementations, the carrying surface 404 is connected at a distal end of the handling mechanism 416 or extender. The carrying surface 404 may be movable by the handling mechanism 416 vertically parallel relative to a face of the AGV rack 406, perpendicularly relative to the face of the AGV rack 406, and horizontally parallel relative to the face of the AGV rack 406. The carrying surface 404 may be extendable by the handling mechanism 416 using the three or more degrees of freedom to retrieve a certain item or mobile storage unit 224 from a separate shelving unit located within reaching distance of the handling mechanism 416 and retractable using the three or more degrees of freedom to place the certain item on one of the AGV 114 shelves 414 of the AGV rack 406.

In some implementations, the carrying surface 404 may be adapted to interface with a mobile storage unit 224. For example, the carrying surface 404 is compatibly engageable with a handling component of the mobile storage unit 224 to lift the mobile storage unit 224 from the separate shelving unit, retain the mobile storage unit 224 during handling, and place the mobile storage unit 224 on the one of the shelves 414 of the AGV rack 406 or another stand, shelf, or location.

In some implementations, the carrying surface 404 may include forks, which are designed to engage with a corresponding support structure (e.g., the handling component or supports) of the mobile storage unit 224. The carrying surface 404, including forks, may be made of any material, such as plastic or metal, which is sufficiently strong to support a mobile storage unit 224 or other item.

The AGV 402a may include a guidance system that determines a location of the AGV 402a within the operating environment. For instance, the guidance system may include one or more sensors that detect and process navigation markers (e.g., QR codes, RFID labels, etc.) to locate the AGV 402a as the AGV 402a traverses the operating environment. The guidance system may be coupled to a controller of the AGV 402a, which may, in some instances, include local object detection intelligence and processing to avoid collision with other objects (e.g., AGVs 114, humans, items, storage shelving units, etc.) in the operating environment.

The AGV 402a may include one or more controllers coupled with the guidance system, handling mechanism 416, drive unit 412, dispatch system 106, etc., to perform the operations described herein. For instance, the one or more controllers may receive a signal from the REX server 118 (e.g., via the dispatch system 106) and signal the drive unit 412 to propel the AGV 402a. The one or more controllers may communicate with the guidance system to determine a location of the AGV 402a within the operating environment and, using the drive unit 412, navigate through the operating environment. The one or more controllers may receive a signal from the REX server 118 indicating to retrieve a particular item from a target storage unit, in response to which, the one or more controllers may instruct the drive unit 412 to position the handling mechanism 416 adjacent to the target shelving unit using the current location determined by the guidance system and then direct the handling mechanism 416 to retrieve the item, for example.

FIGS. 4B and 4C illustrate another example AGV 402b. As illustrated, the AGV 402b may include an AGV 114 item storage rack 406 with a plurality of shelves arranged vertically. The handling mechanism 416 of the AGV 402b may also include a mast having an elevator 408 and a platform 418, which may be raised or lowered using the elevator 408. The platform 418 may extend the carrying surface 404 along a first direction toward the AGV rack 406 or, perpendicularly to the first direction, toward a storage shelving unit adjacent to the AGV 402b. It should be noted that the elements of the AGVs 402a and 402b may be used interchangeably and represent example implementations of the AGV 114; although, other implementations and configurations are possible and contemplated herein.

Figure 5:
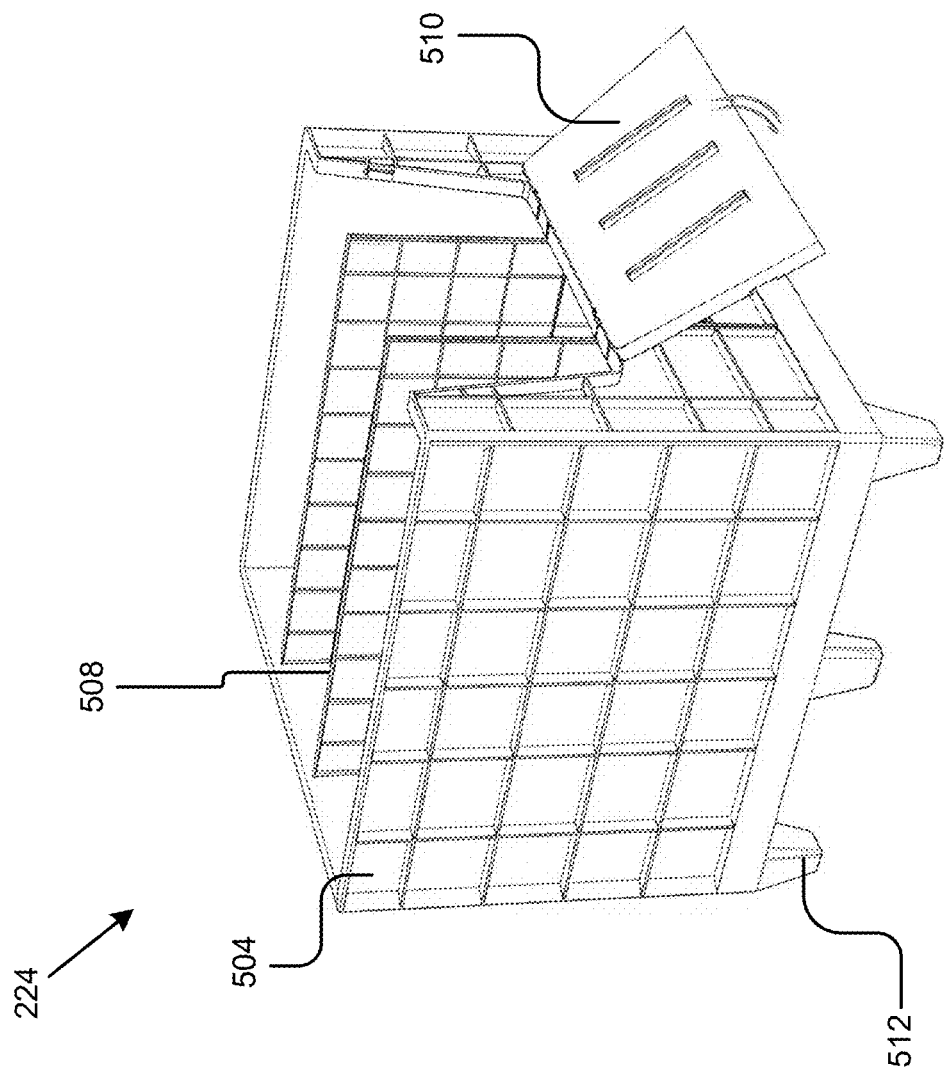
FIG. 5 illustrates an example mobile storage unit.

As illustrated in FIG. 5, a mobile storage unit 224 may comprise a pallet, container, carton, tote or other a holding vessel to support items and may, potentially, be designed to be picked up by a picking AGV 114 using its handling mechanism 416. For example, a mobile storage unit 224 may include a pallet and a holding structure that supports items designed to be picked up by an AGV 114 with forks or another carrying surface 404. In some implementations, a mobile storage unit 224 may be stackable. In some implementations, a mobile storage unit 224 may include a pallet that is attachable to walls to form an open container such as the example depicted in FIG. 5.

In some implementations, the mobile storage unit 224 may additionally or alternatively be used as a tote (e.g., 312) or container in a conveyance device 230 that transports items to an automated-replenishment station 140. For example, a mobile storage unit 224 may serve as one or both of a source target from which items are removed (e.g., by a robotic arm 222) and a target into which items are placed.

As illustrated, a mobile storage unit 224 may include sides 504 and one or more dividers 508 dividing the mobile storage unit 224 into multiple compartments. In some implementations, a mobile storage unit 224 may include a door 510, which may be opened and closed by a picker to provide easy access to items stored in the compartments; although the door 510 may remain closed when transported.

In some implementations, a mobile storage unit 224 may include supports 512 that hold the mobile storage unit 224 on a shelf, so that a carrying surface 404 of the handling mechanism 416 may slide under the mobile storage unit 224 to pick the mobile storage unit 224 up, as described elsewhere herein. In some implementations, a mobile storage unit 224 may include a handling component that interacts with a carrying surface 404 of a AGV 114 to remove the mobile storage unit 224 from a storage shelf. The handling component may be positioned on bottom, top, side, or front of the mobile storage unit 224. For example, a handling component may include a latch, French cleat, slots or arms for receiving prongs of the carrying surface 404, a bottom surface, indentation(s), preconfigured channel(s), or other structures or formations that may be used by the carrying surface 404 to support the mobile storage unit 224. Accordingly, a carrying surface 404 of an AGV 114 may be compatibly engageable with the coupling portion of the mobile storage unit 224 to lift the mobile storage unit 224 from a first target shelving unit, retain the mobile storage unit 224 during handling, and place the mobile storage unit 224 on a second target shelving unit.

Figure 6:
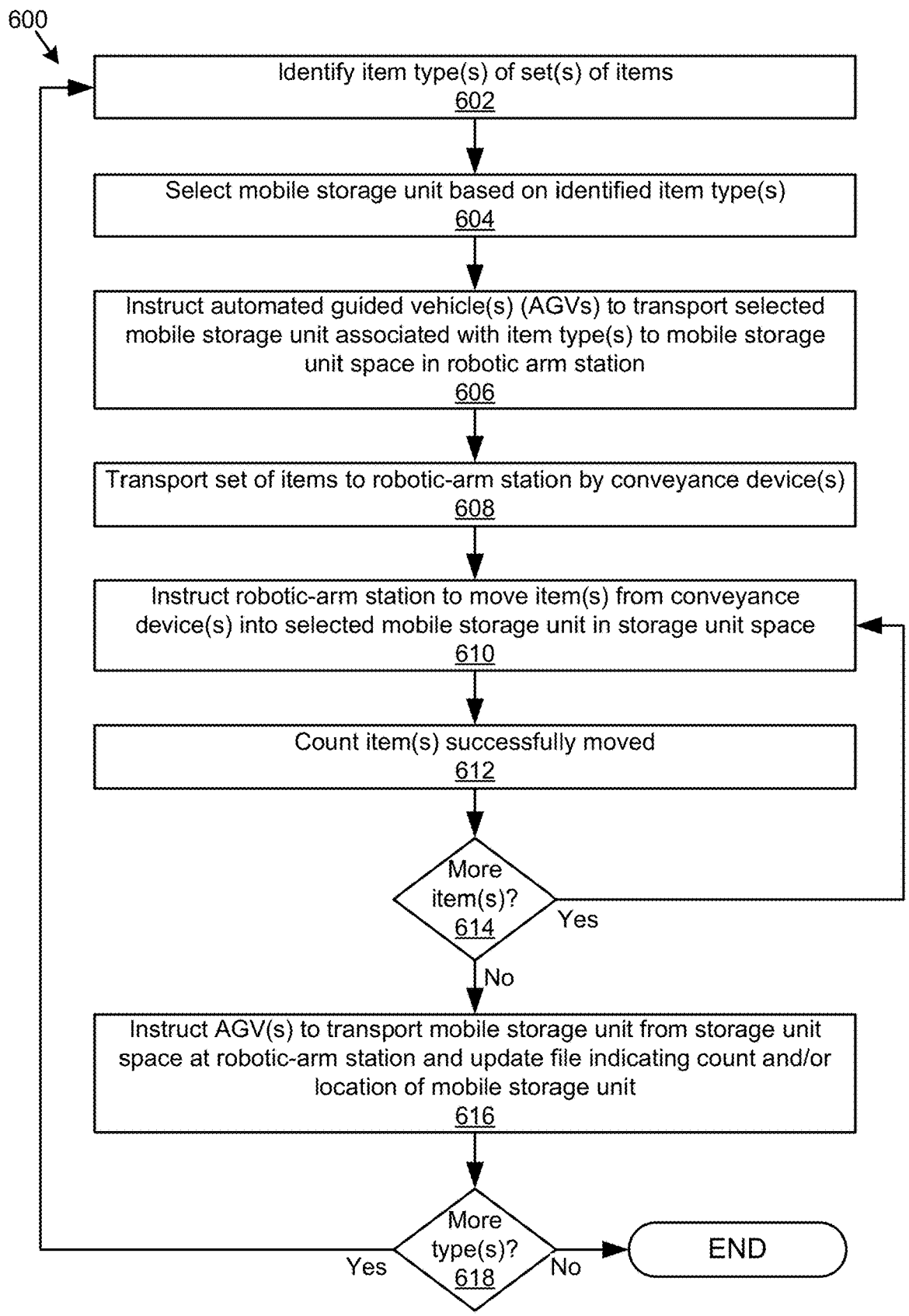
FIG. 6 is a flowchart of an example method for automated robotic replenishment of storage units.

FIG. 6 is a flowchart of an example method 600 for automated robotic replenishment of storage units. The operations described in reference to FIG. 6 may be used with components and features described throughout this description. It should be noted that the operations of the method 600 may be used interchangeably or with the other operations and features used herein, such as those in reference to FIG. 7. Furthermore, it should be noted that operations of the method 600 and of this description may be augmented, reordered, omitted, or modified while still using technologies described in this disclosure.

At 602, the WMS 104 may identify one or more item types of one or more sets of items. For instance, set(s) of items, which may have one or multiple item types (e.g., SKUs), may be received in a fulfillment center, such as in a decanting station 204, as described in reference to FIGS. 2 and 7, such as on a pallet 226. Based on the identification, the WMS 104 may determine one or more operations of a sequence, as described below.

The WMS 104 may identify a group or pallet 226 of items (whether of the same or different types) and/or an item type of an item in the set of items. For instance, the WMS 104 may receive scan data that identifies a type of an item (e.g., whether the item is Brand X pens or Brand Y paperclips), such as based on its visual attributes, a barcode, a QR™ code, or another input. Based on the identification, the WMS 104 may determine other information about the item, such as how many of the item are in a package, the item's size or weight, or its dimensions.

In some implementations, an order or file describing a pallet 226 of items may be stored in the data store 120 accessible by the WMS 104. For instance, the file may indicate identifiers, item types, quantities, timing, identification markers, or other details associated with items and/or a pallet 226. In some implementations, the file may include qualification flags for the items indicating whether those items/item types are eligible (e.g., based on a size, weight, storage location, or other attribute) to be handled by the automated-replenishment station 140 during replenishment. Accordingly, when a pallet 226 and/or item is scanned, the human interface system 108 may identify the item as not being replenishable using the automated-replenishment station 140. Accordingly, the item may be manually replenished to appropriate storage or otherwise handled. In some instances, if the item is scanned/identified at an automated-replenishment station 140, the automated-replenishment station 140, human interface system 108, or another component my send an error or exception message indicating that handling of the item is canceled and should be manually addressed by an agent. In some implementations, other flags may be associated with items/item types, such as eligibility unknown, eligible, qualified eligibility, qualified eligibility with preparation (e.g., unpacking by a human agent), unpickable or non-eligible, or otherwise. Upon identification of these items and, based on their associated flags, the WMS 104 may adjust handling of the items accordingly, for example, by splitting the item types on a pallet 226 into robotic or manual handling.

At 604, the WMS 104 may select a mobile storage unit 224 (and/or a partition of a mobile storage unit 224) based on the identified item types. For example, the WMS 104 may determine one or multiple mobile storage units 224 in the fulfillment centers that are assigned to store the item type or otherwise unassigned. In some instances, the WMS 104 may determine a current inventory and/or capacity of the mobile storage units 224 associated with/assigned to the item type. The WMS 104 may select one or more mobile storage unit 224 for replenishment based on their capacities. For instance, the WMS 104 may select a mobile storage unit 224 with a lowest current inventory, the closest quantity to the quantity of received items, or based on another criteria, as described in further detail elsewhere herein.

In some implementations, the WMS 104 may also determine, based on a file associated with the identified item type and/or identified pallet 226 how many items are received and match that quantity to an available capacity in the identified mobile storage units 224. For example, based on the identification of the item and/or pallet 226, the WMS 104 may access a file associated with an order or pallet 226 to determine the quantity of received item. In instances where there are more items expected to be received in the set of items on the pallet 226/group of items, multiple mobile storage units 224 may be selected. The WMS 104 may select a new, unassigned, and/or or empty mobile storage unit 224 to receive the item(s).

At 606, the WMS 104 may instruct an AGV(s) 114 to transport the selected mobile storage unit(s) 224 associated with the item type(s) to a space in an automated-replenishment station 140 and/or a staging area 206. The mobile storage unit 224 may be brought from a staging area 206 or a storage area 208, as described elsewhere herein. As described in further detail in reference to FIG. 7, an AGV 114 may bring a mobile storage unit 224 to a staging area 206 first and then to the assigned automated-replenishment station 140 at a later point. The WMS 104 may also assign a space of the automated-replenishment station 140 to receive the mobile storage unit 224 based on available spaces, proximity, or other conditions, for instance, where there are multiple mobile storage unit 224 receiving spaces.

In some implementations, an unassigned mobile storage unit 224 may already be present in the automated-replenishment station 140, staging area 206, or storage area 208 and used in place of a partially empty mobile storage unit 224. In some instances, the WMS 104 may instruct an AGV 114 to transport an unassigned and/or empty mobile storage unit 224 from the staging area 206 to an automated-replenishment station 140. In some instances, the WMS 104 may assign an unassigned and/or empty mobile storage unit 224 already in (e.g., previously transported/placed at a mobile storage unit 224 receiving space of the automated-replenishment station 140) the automated-replenishment station 140 to the identified item(s).

At 608, the WMS 104 may transport a set of items to the automated-replenishment station 140 by one or more conveyance devices 230. For instance, the identified item(s) may be transported from a pallet 226 in a decanting or other area of a fulfillment center to an automated-replenishment station 140, which may include a conveyance device 230 receiving area. For example, a tote containing items may be moved to a receiving area of an automated-replenishment station 140 by rollers, an AGV 114, a conveyor belt, a human agent, or other means. Although a tote or container holding the item(s) is described in some examples, the items may be transported to an automated-replenishment station 140, for instance, by a conveyor belt, which moves based on the robotic arm 222 removing items from the conveyor or drops items into a tote in the automated-replenishment station 140 where they can be removed by the robotic arm 222.

A robot, human agent (e.g., based on an instruction from human interface system 108), or other device may place the first set of items on a conveyance device 230, such as in a container 314, in a decanting area 204. The container may be manually or automatically transferred (e.g., responsive to a scan or confirmation input) to a conveyance device receiving area of an automated-replenishment station 140. For example, a human agent may open a pallet 226, pick up a package of pens from the pallet 226, dump the pens into a tote or onto a conveyor belt, and send the items to the automated-replenishment station 140, for instance, by starting a conveyor belt, instructing an AGV 114 to move the tote to the station (e.g., by scanning the tote or indicating that the items are in the tote via a human interface system 108), or pushing the tote on a set of rollers to the automated-replenishment station 140. For example, the fulfillment center may have decanting area(s) 204 and conveyance device(s) 230, robot(s), AGV(s) 114, etc., that travel from the decanting station(s) to the automated-replenishment station 140.

In some implementations, the tote (e.g., 314), item, or conveyor may be scanned by a scanner of a client device of an agent, at the decanting area 204, a beginning of the conveyance device 230, at an end of the conveyance device 230, and/or of the automated-replenishment station 140 to confirm the identity of the item, the transportation of the item, or trigger operations, as noted elsewhere herein.

At 610, the WMS 104 may instruct the automated-replenishment station 140 to move the item(s) from the conveyance device(s) 230 into the selected mobile storage unit 224 at the defined storage unit receiving space. The robotic arm 222 or other device may move one item or multiple items of the set of items transported to the automated-replenishment station 140 at a time. In some instances, prior to moving the item(s), the WMS 104 may verify and wait for an assigned mobile storage unit 224 to be placed at the automated-replenishment station 140. When it is determined that the mobile storage unit 224 is properly placed at the automated-replenishment station 140, the WMS 104 may send a pick mission/instruction (e.g., via various application programming interfaces or protocols) to the automated-replenishment station 140 to perform movement of item(s). As noted elsewhere herein, the pick mission/instruction may include data, such as an item type identifier, a tote/container or conveyance device identifier, a source tote location, a source tote sub-division location, a target mobile storage unit location, a target mobile storage unit subdivision, or other data.

For example, the WMS 104 (e.g., via the equipment controller 110) may instruct a robotic arm 222 to retrieve an item from a certain tote (e.g., where multiple totes or conveyance devices 230 are that the automated-replenishment station 140), grasp the item with a robotic hand, articulate the item to/above the assigned automated-replenishment station 140 (and/or partition thereof), and place or release the item. For instance, the WMS 104 may issue an instruction to move one or more items from a source location (e.g., a defined conveyance device 230) to a target location (e.g., a defined mobile storage unit 224) and a computing device (e.g., an equipment controller 110) at the automated-replenishment station 140, which then determines and executes operations by the robotic-arm to move the item(s). The computing device may use computer vision or intelligent grasping and moving of the items. For example, some off-the-shelf robotic arms include hardware and software for intelligently grasping items or performing other operations based on context (e.g., where an item is laying on its back or side or is in a corner of a tote), such as those robotic arms provided by RightHand Robotics™, although other implementations are possible. For example, an optical camera may be coupled with a robotic arm 222 and use artificial intelligence and computer vision to determine movements for picking up items.

In some implementations, the movement of items may be triggered by the arrival of an assigned mobile storage unit 224 at the automated-replenishment station 140. For instance, an AGV 114 or the REX server 118 may send a message to the WMS 104 indicating that the mobile storage unit 224 has arrived at the automated-replenishment station 140, responsive to which the WMS 104 may instruct the automated-replenishment station 140 to move the associated items into the mobile storage unit 224. In some instances, the WMS 104 instruction may direct the robotic arm 222 to perform actions based on attributes of the item, such as grasp it in a defined way (e.g., from a top, using a defined grasp pressure, etc.), using a defined device (e.g., using suction and/or robotic fingers), placing it in a defined partition of the mobile storage unit 224, or using other defined operations. The automated-replenishment station 140 may send a message to the WMS 104 indicating that the movement has been successfully completed.

When moving items from the conveyance device(s) 230 to the mobile storage unit(s) 224, the WMS 104, equipment controller 110, or another device may verify that the totes, mobile storage units 224, or other devices are in the correct place using sensors, computer vision, etc.

The automated-replenishment station 140 (a computing device coupled therewith) may send a confirmation or error message to the WMS 104, a human interface system 108, or otherwise. For instance, the automated-replenishment station 140 may send a confirmation message indicating that one or more items were accurately picked up and/or moved into the mobile storage unit 224. In some implementations, the automated-replenishment station 140 may identify exceptions, such as an error in grasping an item, a dropped item (e.g., in an unknown area or a source tote), an ineligible item, or other issues (e.g., a robotic arm 222 couldn't pick up item, a tote is empty, etc.), and the station may transmit an error message or pause operation accordingly.

After an item has been successfully moved into a mobile storage unit 224, the automated-replenishment station 140 may move to a subsequent task, which may include moving another item of the same item type, for example, from the same conveyance device 230 to the same mobile storage unit 224. As noted below, if the tasks for the item, conveyance device 230, and/or mobile storage unit 224 are completed, the WMS 104 may instruct the robotic arm 222 to perform another operation respective to a different item, conveyance device 230, and/or mobile storage unit 224.

At 612, the WMS 104 may count the items successfully placed into the mobile storage unit 224. For example, the WMS 104 may iteratively increase a count with each item moved into a mobile storage unit 224. The WMS 104 may update the inventory and remaining capacity of the mobile storage unit(s) 224. The WMS 104 may also update a file associated with the item, order, or pallet 226 to indicate a quantity of the item received and replenished. The WMS 104 may use completion messages to iteratively count items moved or may receive a count from a computing device of the automated-replenishment station 140.

Beneficially, the WMS 104 may count items dumped into a tote 314, received on a pallet 226, and/or moved into mobile storage units 224. By automatically counting individual items moved, the technology reduces errors caused by human counting, reduces fatigue, and automatically and accurately keeps track of orders received and inventory in the mobile storage units 224 and fulfillment center. For instance, it would be difficult and tedious for a human to count tens or hundreds of items (e.g., if scores of an item fit in a certain mobile storage unit 224), divide quantities among mobile storage units 224, or perform similar operations in an accurate and repeatable manner.

At 614, the WMS 104 may determine whether there are additional items in the conveyance device(s) 230 and/or whether replenishment of the mobile storage unit 224 has been completed, for example, based on the counted, moved items. If there are additional items at the automated-replenishment station 140 and/or capacity in the mobile storage unit 224, the WMS 104 may instruct the robotic arm 222 to, or the robotic station may automatically, move another item to the mobile storage unit 224. The WMS 104 may move items from multiple conveyance devices 230 to a single mobile storage unit 224 (e.g., where multiple conveyance devices 230 carry the same item type) or from a single conveyance device 230 into multiple mobile storage units 224 (e.g., where multiple mobile storage units 224 store the same item type)

In some implementations, as each item is moved, the WMS 104 may determine if there is additional capacity (e.g., based on the count) in the mobile storage unit 224. If the mobile storage unit 224 has been completely filled, the WMS 104 may select another mobile storage unit 224 to fill, for instance, in another space of the automated-replenishment station 140 or to be brought to the automated-replenishment station 140. In some instances, if no available capacity is present in another mobile storage unit 224 at the station, the WMS 104 may instruct an AGV(s) 114 to remove the mobile storage unit 224 and place a new mobile storage unit 224 (e.g., assigned to the item type or with unassigned capacity) to the automated-replenishment station 140 to receive remaining items of the item type at the automated-replenishment station 140.

If there are no additional items in the source tote or if there is not additional capacity in a mobile storage unit 224 (or if there are no additional received items in a pallet 226 or conveyance device 230), for instance, the WMS 104 may proceed to 616, at which it may instruct one or more AGVs 114 to transport the mobile storage unit 224 from the space at the automated-replenishment station 140. The WMS 104 may also update a file indicating the count of items in the mobile storage unit 224 and/or the location of the mobile storage unit 224.

In some implementations, where a mobile storage unit 224 has been completely replenished, the WMS 104 may instruct one or more AGVs 114 to pick up the replenished mobile storage unit 224 and replace it with another mobile storage unit 224 to receive remaining items in the conveyance device 230 (or from the pallet 226). The replacement mobile storage unit 224 may be an empty or unassigned storage unit to which the WMS 104 may assign the item type, or the replacement storage unit may already have inventory of the item type stored therein but may receive additional items for replenishment.

For example, the WMS 104 may determine a successful movement of the first item from the one or more conveyance devices 230 into the first mobile storage unit 224 and, responsive to determining the successful movement, instruct the one or more AGVs 114 to transport the mobile storage unit 224 from the space at the automated-replenishment station 140 to a storage area 208. For instance, if the mobile storage unit 224 is replenished, the AGV 114 may transport it back to a long-term storage area 208.

In some instances, when the mobile storage unit 224 has not been fully replenished (e.g., if there are additional items on the pallet 226 to replenish the mobile storage unit 224), but there are no additional items of the associated type at the automated-replenishment station 140, the WMS 104 may instruct an AGV 114 to take the mobile storage unit 224 to a staging area 206, so that it can quickly be brought back to the automated-replenishment station 140 by an AGV 114, for instance, to receive additional items on additional conveyance devices 230.

At 618, the WMS 104 may determine whether there are additional types or sets of items to move into mobile storage units 224 and/or whether there are additional mobile storage units 224 assigned to be replenished with the items of the identified item type(s). For instance, the WMS 104 may determine whether a pallet 226 includes a second set of items of a second type. The WMS 104 may then convey items to the automated-replenishment station 140 (or another automated-replenishment station 140), transport associated mobile storage unit(s) 224 to the automated-replenishment station 140, and move the items of the second set into the mobile storage unit(s) 224.

It should be noted that although the example of FIG. 6 is described as if replenishing multiple mobile storage units 224 is sequential, the operations may be performed in parallel or other orders to balance timing and allocation of resources (e.g., available spaces for receiving mobile storage units 224 at an automated-replenishment station 140). Accordingly, the method 600 may fill a mobile storage unit 224 partially with a first item type and then fill another mobile storage unit 224 with a second item type while waiting for additional units of the first item type to be conveyed to the mobile storage unit 224.

Figure 7:
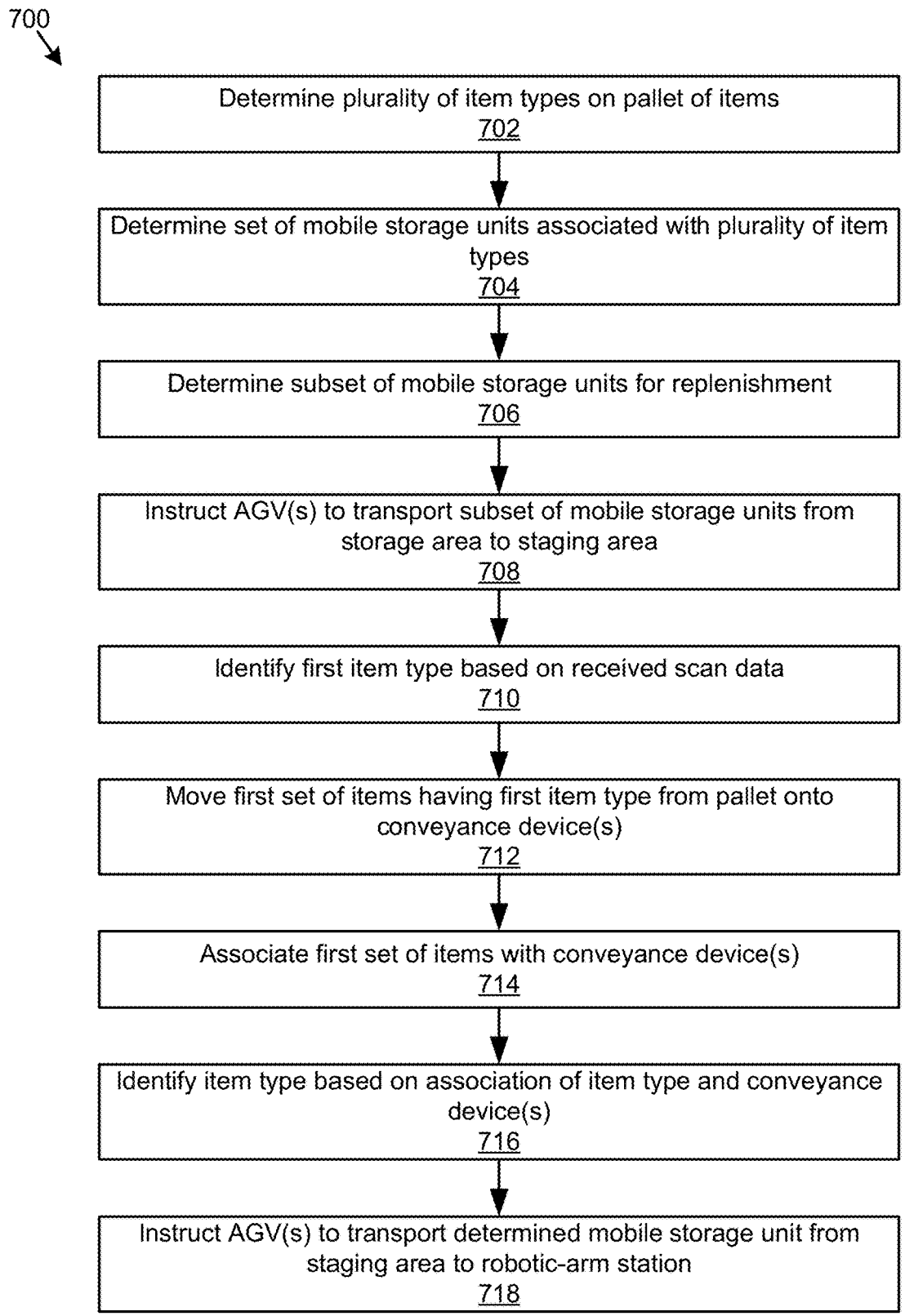
FIG. 7 is a flowchart of an example method for preparing items and mobile storage units for replenishment.

FIG. 7 is a flowchart of an example method 700 for preparing items and mobile storage units 224 for replenishment. The operations of the method 700 may provide additional or alternative details to those described above, for example, in reference to FIG. 6. It should also be noted that the sequence and set of operations of the method 700 is provided as an illustrative example, but other implementations are possible and contemplated herein.

At 702, the WMS 104 may determine one or a plurality of item types of items that are on a pallet 226 or other container, for example, with multiple items. For instance, a pallet 226 may be identified based on a user input (e.g., of an identification code of the pallet 226) or a scan of an identification marker (e.g., a barcode, QR™ code, RFID tag, etc.), such as a label on the pallet 226. For example, the WMS 104 may receive scan data identifying a pallet 226 that holds a plurality of items of a plurality of item types. Based on the identification of the pallet 226, the WMS 104 may access a file associated with the pallet 226 indicating various data, such as the item types or quantities on the pallet 226. In some instances, the pallet 226 may be determined based on a scan of a single item on the pallet 226, for example, by identifying a pallet 226 expected to be received or scanned at a certain time and having the item type.

In some implementations, prior to scanning or receiving a pallet 226, an order file may be created in a data store 120 accessible to the WMS 104. For instance, the order file may indicate attributes items (e.g., types, quantities, etc.) associated with a pallet 226, or other details. As noted in further detail above, the items (e.g., as indicated in the item data 128) may be associated with flag indicating whether replenishment of the items may be performed robotically or otherwise.

A physical pallet 226 may be received in a fulfillment center based on a replenishment order. In some instances, the pallet 226 may include/hold multiple item types or SKUs (e.g., 60 SKUs on a single pallet 226) that may be stored individually or in cartons on the pallet 226. It should be noted that although a pallet 226 is described, other groupings of items may also be used.

In some implementations, a human agent may scan a pallet 226 (e.g., using a client device coupled a component of the system 100) when it is received at a receiving dock and/or decanting area 204 of a fulfillment center. The human interface system 108 may issue an instruction to the agent to send the pallet 226 to manual or robotic replenishment based on the scan (e.g., based on flags associated with the item(s) on the pallet 226). In some instances, replenishment task assignments may be generated to a robotic stocking location or station to instruct that only robot-eligible items are sent to an automated-replenishment station 140. In some instances, the human interface system 108 may instruct an agent or robot to transport or select non-eligible cases/item types to manual or other stocking stations. As noted above, if an item type that is not eligible for robotic-replenishment is identified at an automated-replenishment station 140 (or at a decanting area 204 or conveyance device 230 associated with an automated-replenishment station 140), the WMS 104 may pause the station and send an instruction to an agent via the human interface system 108 indicating to reintroduce the item at a manual station, for example.

At 704, the WMS 104 may determine a set of mobile storage units 224 associated with the item types on the pallet 226. For instance, the WMS 104 may identify, using a file associated with the identified pallet 226 in the data store 120, item types on the pallet 226. Based on the determined item types, the WMS 104 may determine one or more mobile storage units 224 associated with the item types, such as those already storing some items of the type or already assigned to the item type. In some instances, the WMS 104 may newly assign mobile storage units 224 to item types from among the set of item types.

The WMS 104 may also determine current locations of the mobile storage units 224, which may be located in a storage area 208, a staging area 206, an automated-replenishment station 140, or another location. The determined set of mobile storage units 224 may include items of the same or different item types, may be empty, or may be newly assigned for receiving items from the set of item types on the identified pallet 226. In some instances, the mobile storage units 224 may have various configurations, partition arrangements, or other attributes that may be matched against attributes of the item type(s) when determining and/or assigning the mobile storage units 224. In some instances, the WMS 104 may determine and/or select a specific partition of a divided mobile storage unit 224.

In some implementations, at 706, the WMS 104 may determine a subset of the set of mobile storage units 224 for replenishment, for example, based on a current quantity of items stored in each of the subset of mobile storage units 224, an expected quantity of items on the pallet 226, a current location of the mobile storage units 224, attributes of the items and/or mobile storage units 224, or based on other criteria.

In some implementations, the WMS 104 may determine identities of the subset of mobile storage units 224 associated with the plurality of item types based on whether those mobile storage units 224 currently hold less than a full capacity of an item associated with that mobile storage unit 224 (e.g., based on a MSU data 130 or whether a mobile storage unit 224 is flagged for replenishment).

In some implementations, the WMS 104 may select one or more mobile storage units 224 based on those mobile storage units 224 that have a least quantity of items stored therein, based on the mobile storage whose available capacity is nearest to expected quantity of items on a pallet 226, or otherwise based on a quantity of items in each mobile storage unit 224. For example, the WMS 104 may determine a set of storage units associated with an item type, determine current inventories of the item type in each of the storage units, rank the storage units by their current inventories, and then select, as a subset, the storage units with lowest rank/quantity.

The selection of the subset of mobile storage units 224 may additionally or alternatively be based on a closest location of the mobile storage units 224 to an automated-replenishment station 140 or staging area 206, a matching mobile storage unit size, how frequently a mobile storage unit 224 is used, whether the mobile storage unit 224 also includes other items (e.g., based on how frequently the items in the mobile storage unit 224 are ordered or picked together), a usefulness of the mobile storage unit 224, or various other criteria.

At 708, the WMS 104 may instruct one or more AGVs 114 to transport the subset of mobile storage units 224 from a storage area 208 to a staging area 206, for example, associated with the automated-replenishment station 140. For instance, if a pallet 226 includes 40 SKUs, the WMS 104 may proactively (e.g., responsive to an identification of the pallet 226 and/or mobile storage units 224) instruct AGVs 114 to transport 50 corresponding mobile storage units 224 to the staging area 206 and/or the automated-replenishment station 140. Accordingly, as described below, a mobile storage unit 224 may be more quickly brought to the automated-replenishment station 140 from the staging area 206 when it is needed (e.g., when items from an associated item type are identified at the automated-replenishment station 140 and/or conveyance device 230).

In some implementations, where a fulfillment center has multiple automated-replenishment stations 140, the WMS 104 may select a particular station, for example, based on the closest station to a location of a pallet 226. Additionally or alternatively, the WMS 104 may select a staging area 206 at which to stage the set of mobile storage unit 224. For instance, where there are multiple staging areas 206, the WMS 104 may select a staging area 206 that is closest to a selected automated-replenishment station 140 or that has an available storage location for the mobile storage unit(s) 224.

In some implementations, a staging area 206 may have multiple racks, shelves, or other spaces for receiving mobile storage units 224. For instance, while a storage area 208 may include hundreds of storage spots for mobile storage units 224, a staging area 206 may have fewer spots located (e.g., 20, 40, 60, etc.) closer to the automated-replenishment station(s) 140. The WMS 104 may select a spot from among multiple available spots in the staging area 206, for example, randomly, sequentially, based on a nearest available location to an automated-replenishment station 140 or another criterion.

For example, the WMS 104 may instruct one or more AGVs 114 to transport the set, subset, or a defined mobile storage unit 224 from determined current locations in the storage area 208, or another location in the fulfillment center, to a space in the staging area 206. For example, the WMS 104 may determine a location of each of the mobile storage units 224 and instruct one or more AGVs 114 to transport them to the assigned spot(s) in the staging area 206. For example, the WMS 104 may transmit a message to the REX server 118 indicating a mobile storage unit 224 and/or its current location, an operation, and a destination (e.g., in the staging area 206). The REX server 118 or another component of the system may generate a set of instructions including a navigation path by the AGV 114, a movement of a handling mechanism of the AGV 114 to retrieve a mobile storage unit 224 from a source shelf, a movement of the handling mechanism to a place the mobile storage unit 224e at a target shelf, or other operations.

At 710, the WMS 104 may identify a first item type based on received scan data. For instance, the WMS 104 may receive scan data of an item on a conveyance device 230, by a client device (e.g., where an item is scanned when placing it onto a conveyance device 230), at an automated-replenishment station 140, or otherwise, to identify the item. For instance, a scanner at an automated-replenishment station 140 may scan an item or a tote or other conveyance device 230.

For example, in some implementations, a human agent may scan a marker (e.g., a barcode) on a single item, scan a marker on a conveyance device 230 (e.g., a barcode on a tote), dump an entire container of units of the item onto/into the conveyance device 230, and the WMS 104 may automatically associate (e.g., as noted in reference to 714) the particular conveyance device 230 with the item, so that the items are identified at the automated-replenishment station 140 based on a position or identity of the conveyance device 230.

At 712, the WMS 104 may move a first set of items having the first item type from the pallet 226 onto one or more conveyance devices 230. For example, as described in further detail above, a box of items (e.g., of a common type) may put onto/into a conveyance device 230 in a decanting area 204 of a fulfillment center and the conveyance device 230 may transfer the items to an automated-replenishment station 140. For example, the operation may include placing the set of items in a tote/container 314 in a decanting area 204, transporting the container 314 between the decanting area 204 and a receiving area (e.g., a tote or conveyance device 230 receiving area, as described above), of an automated-replenishment station 140. For instance, the container 314 may be transported by a conveyor belt, conveyor rollers, an AGV 114, or another method.

For example, depending on the implementation, a robot or client device may scan a case/carton of items, open the carton, and dump the items into a tote 314. In some implementations, a human agent may use a client device coupled with the WMS 104 to scan a carton, which identifies the item and may cause one or more operations described herein to be performed, such as moving a mobile storage unit 224 to a staging area 206 and/or automated-replenishment station 140. For instance, the human interface system 108 may display an indication to the agent that the item type is eligible to be robotically replenished. In some implementations, the human interface system 108 (e.g., on a client device) may instruct an agent to place the item(s) in on a defined conveyance device 230 or otherwise transport the items to a receiving area of an automated-replenishment station 140.

In some implementations, at 714, the WMS 104 may associate the set of items or an item type with the conveyance device(s) 230, for example, in item data 128, MSU data 130, or automated-replenishment station 140 data. For instance, the WMS 104 may use the identification of the item and the conveyance device 230 to associate them together and/or identify a location (e.g., a receiving area) of an automated-replenishment station 140 at which the items are located, so that they can be accurately moved by a robotic arm 222. The conveyance device 230 may be identified based on a second scan of the conveyance device 230 (e.g., by a client device of the agent at decanting area 204 or a scanner associated with the conveyance device 230 or automated-replenishment station 140), a confirmation by the user that the item(s) was placed on a certain container, or by an instruction issued by the human interface system 108 (or REX server 118, etc.) to place the item(s) in/on a defined conveyance device 230.

It should be noted that although a single item type is described as being placed in a container, multiple types may be placed in a container and the automated-replenishment station 140 may use computer vision to differentiate between and/or identify items and, based on the identity, determine into which mobile storage unit 224 to place the items.

At 716, the WMS 104 may identify an item type of an item (e.g., in the first set of items) based on the association of the item type and the one or more conveyance devices 230. For example, the WMS 104 may use the association of the conveyance device 230 with the item types to determine a source location (e.g., a conveyance device 230/location thereof) and a destination location (e.g., an associated mobile storage unit 224/location thereof).

In some implementations, the WMS 104 may identify the item type and/or conveyance device 230 based on an additional scan of an item in/on the conveyance device 230 and/or of the conveyance device 230 itself (e.g., of an identification marker), for example, by a scanner at the automated-replenishment station 140.

At 718, the WMS 104 may instruct one or more AGVs 114 to transport a determined mobile storage unit 224 from the staging area 206 to the automated-replenishment station 140 (e.g., to an assigned slot/space at the station), for example, based on the identified item type. In some implementations, responsive to an item being associated with or scanned into a conveyance device 230 (e.g., a tote or container conveyed to an automated-replenishment station 140), the WMS 104 may instruct an AGV 114 to transport mobile storage units 224 from a staging area 206 to a space in the automated-replenishment station 140, for example, as described in reference to 708. For example, the WMS 104 or REX server 118 may generate a set of AGV tasks for the AGV(s) 114 to bring the mobile storage unit(s) 224 to the automated-replenishment station 140, so that the identified items may be placed therein, as described in reference to FIG. 6. Accordingly, because the staging area 206 is closer to the automated-replenishment station 140, the mobile storage unit 224 may be moved more quickly and downtime of the station may be reduced.

Figure 8:
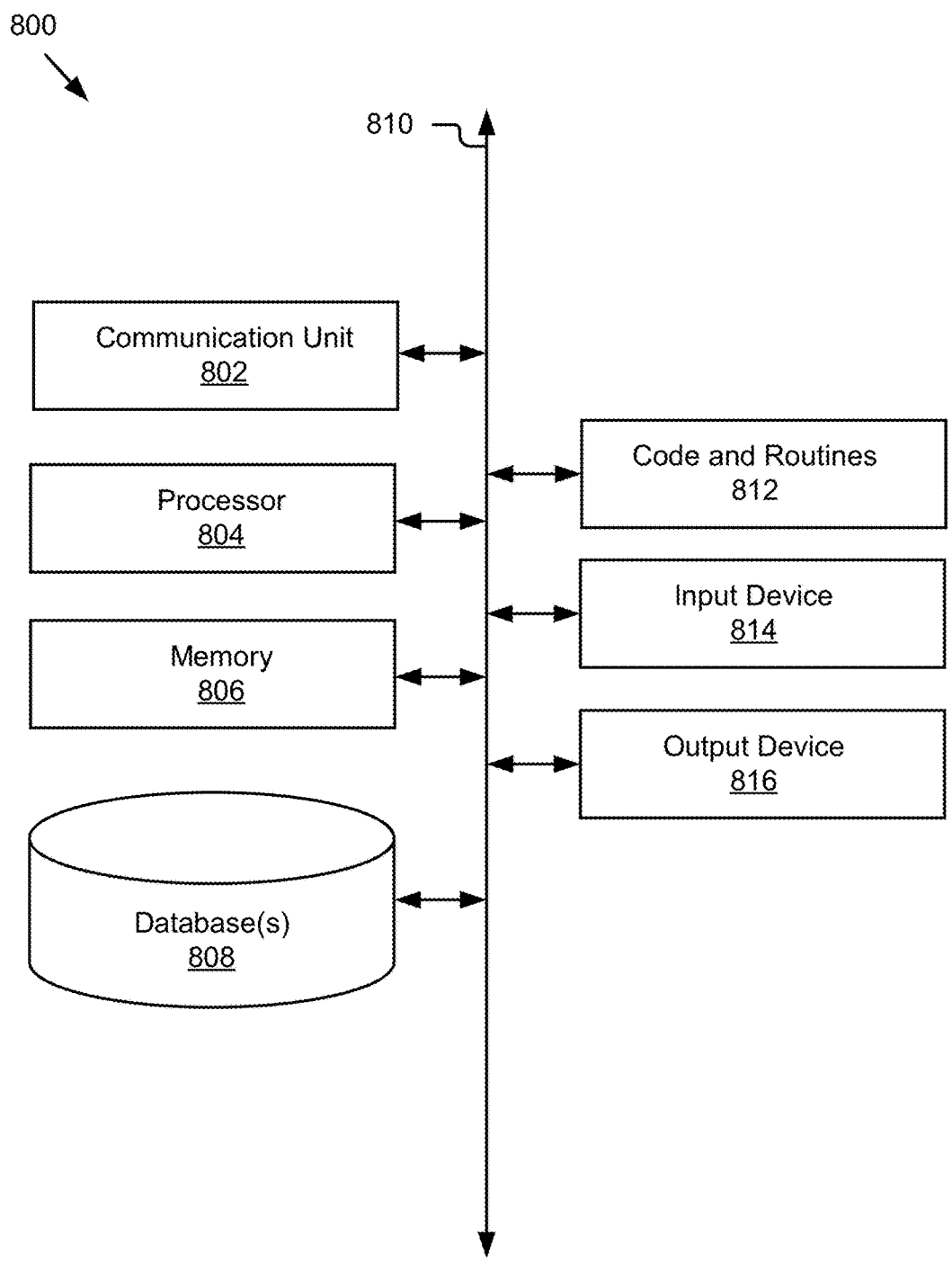
FIG. 8 is a block diagram illustrating an example computing system.

FIG. 8 is a block diagram illustrating an example computing system 800. The example computing system 800 may correspond to a WES 102, a WMS 104, a dispatch system 106, a human interface system 108, equipment controller(s) 110, REX server 118, a client device, a computing device of an automated-replenishment station 140, or other component of the system 100, for example.

The code and routines 812 may include computer logic executable by the processor 804 on a computing system 800 to provide for the functionality described in reference to one or more of the components of the system 100. For instance, in some implementations, the code and routines may include one or more of the components of the WES 102 or equipment controller(s) 110.

As depicted, the computing system 800 may include a processor 804, a memory 806, a communication unit 802, an output device 816, an input device 814, and database(s) 808, which may be communicatively coupled by a communication bus 810. The computing system 800 depicted in FIG. 8 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 800 may include various operating systems, sensors, additional processors, and other physical configurations. Although, for purposes of clarity, FIG. 8 only shows a single processor 804, memory 806, communication unit 802, etc., it should be understood that the computing system 800 may include a plurality of one or more of these components.

The processor 804 may execute software instructions by performing various input, logical, and/or mathematical operations. The processor 804 may have various computing architectures to process data signals including, for example, a complex instruction set computer (CISC) architecture, a reduced instruction set computer (RISC) architecture, and/or an architecture implementing a combination of instruction sets. The processor 804 may be physical and/or virtual, and it may include a single core or plurality of processing units and/or cores. In some implementations, the processor 804 may be capable of generating and providing electronic display signals to a display device, supporting the display of images, capturing and transmitting images, performing complex tasks including various types of feature extraction and sampling, etc. In some implementations, the processor 804 may be coupled to the memory 806 via the bus 810 to access data and instructions therefrom and store data therein. The bus 810 may couple the processor 804 to the other components of the computing system 800 including, for example, the memory 806, the communication unit 802, the input device 814, the output device 816, and the database(s) 808.

The memory 806 may store and provide access to data to the other components of the computing system 800. The memory 806 may be included in a single computing device or a plurality of computing devices. In some implementations, the memory 806 may store instructions and/or data that may be executed by the processor 804. For example, the memory 806 may store the code and routines 812. The memory 806 is also capable of storing other instructions and data, including, for example, an operating system, hardware drivers, other software applications, databases, etc. The memory 806 may be coupled to the bus 810 for communication with the processor 804 and the other components of computing system 800.

The memory 806 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 804. In some implementations, the memory 806 may include one or more of volatile memory and non-volatile memory (e.g., RAM, ROM, hard disk, optical disk, etc.). It should be understood that the memory 806 may be a single device or may include multiple types of devices and configurations.

The bus 810 can include a communication bus for transferring data between components of a computing device or between computing devices, a network bus system including a network or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 802 may include one or more interface devices (I/F) for wired and wireless connectivity among the components of the system 100. For instance, the communication unit 802 may include various types known connectivity and interface options. The communication unit 802 may be coupled to the other components of the computing system 800 via the bus 810. The communication unit 802 may be electronically communicatively coupled to a network (e.g., wiredly, wirelessly, etc.). In some implementations, the communication unit 802 can link the processor 804 to a network, which may in turn be coupled to other processing systems. The communication unit 802 can provide other connections to a network and to other entities of the system 100 using various standard communication protocols.

The input device 814 may include any device for inputting information into the computing system 800. In some implementations, the input device 814 may include one or more peripheral devices. For example, the input device 814 may include a keyboard, a pointing device, microphone, an image/video capture device (e.g., camera), a touch-screen display integrated with the output device 816, optical scanner, barcode reader, QR™ code reader, RFID (radio-frequency identification) tag reader, etc.

The output device 816 may be any device capable of outputting information from the computing system 800. The output device 816 may include one or more of a display (LCD, OLED, etc.), a printer, a 3D printer, a haptic device, audio reproduction device, touch-screen display, etc. In some implementations, the output device is a display which may display electronic images and data output by the computing system 800 for presentation to a user, such as a picker or associate in the order fulfillment center. In some implementations, the computing system 800 may include a graphics adapter (not shown) for rendering and outputting the images and data for presentation on output device 816. The graphics adapter (not shown) may be a separate processing device including a separate processor and memory (not shown) or may be integrated with the processor 804 and memory 806.

The database(s) are information source(s) for storing and providing access to data. The data stored by the database(s) 808 may be organized and queried using various criteria including any type of data stored by them, such as the data in the data store 120 and other data discussed herein. The database(s) 808 may include file systems, data tables, documents, databases, or other organized collections of data. Examples of the types of data stored by the database(s) 808 may include the data described herein, for example, in reference to the data store 120.

The database(s) 808 may be included in the computing system 800 or in another computing system and/or storage system distinct from but coupled to or accessible by the computing system 800. The database(s) 808 can include one or more non-transitory computer-readable mediums for storing the data. In some implementations, the database(s) 808 may be incorporated with the memory 806 or may be distinct therefrom. In some implementations, the database(s) 808 may store data associated with a database management system (DBMS) operable on the computing system 800. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies, and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   identifying, by one or more processors communicatively coupled with a replenishment station, one or more item types of a first set of items;
   instructing, by the one or more processors, one or more automated guided vehicles ("AGVs") to transport a first mobile storage unit to a first space of one or more mobile storage unit spaces at the replenishment station, the first mobile storage unit being selected from a plurality of mobile storage units based on the one or more item types;
   transporting, by one or more conveyance devices, the first set of items to the replenishment station, the replenishment station including a robotic arm, one or more conveyance device receiving areas, and the one or more mobile storage unit spaces;
   instructing, by the one or more processors, the replenishment station to move a plurality of the first set of items from the one or more conveyance devices into the first mobile storage unit including:
      instructing, by the one or more processors, the replenishment station to move a first item of the first set of items from the one or more conveyance devices into the first mobile storage unit at the first space; and
   counting, by the one or more processors, the plurality of the first set of items moved into the first mobile storage unit by the replenishment station.

2. The method of claim 1, further comprising:
   receiving, by the one or more processors, scan data identifying a pallet, the pallet holding a plurality of items having a plurality of item types, the plurality of items including the first set of items; and
   moving one or more of the first set of items having the one or more item types from the pallet onto the one or more conveyance devices.

3. The method of claim 2, further comprising:
   determining, by the one or more processors, the plurality of item types based on the scan data identifying the pallet; and
   responsive to receiving the scan data, instructing, by the one or more processors, the one or more AGVs to transport the first mobile storage unit from a storage area of a fulfillment center to a staging area associated with the replenishment station.

4. The method of claim 2, further comprising:
   determining, by the one or more processors, a set of mobile storage units associated with the plurality of item types, the set of mobile storage units being in a storage area of a fulfillment center, each of the set of mobile storage units holding less than a full capacity of an item associated with that mobile storage unit, the set of mobile storage units including the first mobile storage unit;
   instructing, by the one or more processors, the one or more AGVs to transport the set of mobile storage units from the storage area to a staging area associated with the replenishment station; and
   instructing, by the one or more processors, the one or more AGVs to transport the first mobile storage unit from the staging area associated with the replenishment station to the first space at the replenishment station.

5. The method of claim 2, further comprising:
   determining, by the one or more processors, a set of mobile storage units associated with the plurality of item types based on the scan data, each of the set of mobile storage units storing at least one of the plurality of item types; and
   determining, by the one or more processors, a subset of the set of mobile storage units based on a current quantity of items stored in each of the subset of mobile storage units, the first mobile storage unit being selected from the subset of the mobile storage units.

6. The method of claim 1, further comprising:
   placing the first set of items in a container in a decanting area of a fulfillment center, the one or more conveyance devices including the container transported between the decanting area and the one or more conveyance device receiving areas of the replenishment station by one or more of a conveyor belt, conveyor rollers, and the one or more AGVs.

7. The method of claim 1, wherein identifying the one or more item types of the first set of items includes:

receiving, by the one or more processors, scan data at the replenishment station, the scan data identifying one or more of the one or more item types and the one or more conveyance devices.

8. The method of claim 1, wherein identifying the one or more item types of the first set of items includes:
receiving, by the one or more processors, first scan data identifying the one or more item types at a decanting area;
receiving, by the one or more processors, second scan data identifying a container at the decanting area, the one or more conveyance devices including the container;
associating, by the one or more processors, the container with the one or more item types in computer memory accessible to the one or more processors;
placing the first set of items into the container; and
identifying, by the one or more processors, the one or more item types using the association of the container with the one or more item types.

9. The method of claim 1, further comprising:
identifying, by the one or more processors, a second set of items having a second item type, the first set of items being transported to the replenishment station by a first conveyance device of the one or more conveyance devices, the second set of items being transported to the replenishment station by a second conveyance device of the one or more conveyance devices;
based on the second item type, instructing, by the one or more processors, the one or more AGVs to transport a second mobile storage unit to a second space of the one or more mobile storage unit spaces, the second mobile storage unit being selected from the plurality of mobile storage units based on the second item type; and
instructing, by the one or more processors, the replenishment station to move the one or more second items from the second conveyance device into the second mobile storage unit.

10. The method of claim 1, further comprising:
determining, by the one or more processors, a successful movement of the first item from the one or more conveyance devices into the first mobile storage unit; and
responsive to determining the successful movement, instructing, by the one or more processors, the one or more AGVs to transport the first mobile storage unit from the first space at the replenishment station to a storage area.

11. A system, comprising:
one or more containers adapted to hold one or more items;
one or more container transportation devices adapted to transport the one or more containers to one or more container receiving areas of a replenishment station, wherein each of the one or more container transportation devices include:
a horizontal sliding mechanism supporting a container and allowing the container to slide between a decanting area and a container receiving area of the one or more container receiving areas;
the replenishment station including the one or more container receiving areas, one or more mobile storage unit receiving spaces, and a robotic arm, the robotic arm adapted to pick up the one or more items from the one or more containers in the one or more container receiving areas, move the one or more items, and place the one or more items into one or more mobile storage units in the one or more mobile storage unit receiving spaces; and
one or more automated guided vehicles ("AGVs") adapted to transport the one or more mobile storage units between the one or more mobile storage unit receiving spaces and a mobile storage unit storage area.

12. The system of claim 11, wherein each of the one or more container transportation devices include:
a handle adapted to push or pull the container horizontally on the horizontal sliding mechanism when force is applied to the handle.

13. The system of claim 11, wherein the replenishment station includes:
two or more container receiving areas; and
two or more mobile storage unit receiving spaces.

14. The system of claim 13, wherein:
the two or more container receiving areas are located on a first side of the replenishment station; and
the two or more mobile storage unit receiving spaces are located on a second side of the replenishment station, the first side being perpendicular to the second side relative to the robotic arm.

15. The system of claim 11, wherein the mobile storage unit storage area includes:
a storage area where a set of mobile storage units are stored, the storage area including a first set of shelves; and
a mobile storage unit staging area associated with the replenishment station where a subset of the set of mobile storage units are stored, the one or more AGVs being adapted to transport one or more of the subset of mobile storage units between the first set of shelves and the mobile storage unit staging area.

16. The system of claim 15, wherein the mobile storage unit staging area includes:
a second set of shelves adapted to hold the subset of mobile storage units, the second set of shelves being fewer in quantity than the first set of shelves, the second set of shelves being separate from and closer to the replenishment station than the first set of shelves.

17. The system of claim 11, further comprising:
a scanner communicatively coupled with a processor, the scanner capturing an identification of a pallet, the processor adapted to instruct the one or more AGVs to transport the one or more mobile storage units to a mobile storage unit staging area based on the identification of the pallet.

18. A method comprising:
identifying, by one or more processors communicatively coupled with a replenishment station, one or more item types of a first set of items;
instructing, by the one or more processors, one or more automated guided vehicles ("AGVs") to transport a first mobile storage unit to a first space of one or more mobile storage unit spaces at the replenishment station, the first mobile storage unit being selected from a plurality of mobile storage units based on the one or more item types;
transporting, by one or more conveyance devices, the first set of items to the replenishment station, the replenishment station including a robotic arm, one or more conveyance device receiving areas, and the one or more mobile storage unit spaces;
placing the first set of items in a container in a decanting area of a fulfillment center, the one or more conveyance devices including the container transported between the decanting area and the one or more conveyance device receiving areas of the replenishment station by one or more of a conveyor belt, conveyor rollers, and the one or more AGVs; and instructing, by the one or more processors, the replenishment station to move a first item of the first set of items from the one or more conveyance devices into the first mobile storage unit at the first space.

19. A method comprising:

identifying, by one or more processors communicatively coupled with a replenishment station, one or more item types of a first set of items;

instructing, by the one or more processors, one or more automated guided vehicles ("AGVs") to transport a first mobile storage unit to a first space of one or more mobile storage unit spaces at the replenishment station, the first mobile storage unit being selected from a plurality of mobile storage units based on the one or more item types;

transporting, by one or more conveyance devices, the first set of items to the replenishment station, the replenishment station including a robotic arm, one or more conveyance device receiving areas, and the one or more mobile storage unit spaces;

instructing, by the one or more processors, the replenishment station to move a first item of the first set of items from the one or more conveyance devices into the first mobile storage unit at the first space;

determining, by the one or more processors, a successful movement of the first item from the one or more conveyance devices into the first mobile storage unit; and responsive to determining the successful movement, instructing, by the one or more processors, the one or more AGVs to transport the first mobile storage unit from the first space at the replenishment station to a storage area.

20. A method comprising:

identifying, by one or more processors communicatively coupled with a replenishment station, one or more item types of a first set of items, wherein identifying the one or more item types of the first set of items includes:
  receiving, by the one or more processors, first scan data identifying the one or more item types at a decanting area;
  receiving, by the one or more processors, second scan data identifying a container at the decanting area, one or more conveyance devices including the container;
  associating, by the one or more processors, the container with the one or more item types in computer memory accessible to the one or more processors;
  placing the first set of items into the container; and
  identifying, by the one or more processors, the one or more item types using the association of the container with the one or more item types;

instructing, by the one or more processors, one or more automated guided vehicles ("AGVs") to transport a first mobile storage unit to a first space of one or more mobile storage unit spaces at the replenishment station, the first mobile storage unit being selected from a plurality of mobile storage units based on the one or more item types;

transporting, by the one or more conveyance devices, the first set of items to the replenishment station, the replenishment station including a robotic arm, one or more conveyance device receiving areas, and the one or more mobile storage unit spaces; and instructing, by the one or more processors, the replenishment station to move a first item of the first set of items from the one or more conveyance devices into the first mobile storage unit at the first space.

21. A system, comprising:

one or more containers adapted to hold one or more items;

one or more container transportation devices adapted to transport the one or more containers to one or more container receiving areas of a replenishment station;

the replenishment station including the one or more container receiving areas, one or more mobile storage unit receiving spaces, and a robotic arm, the robotic arm adapted to pick up the one or more items from the one or more containers in the one or more container receiving areas, move the one or more items, and place the one or more items into one or more mobile storage units in the one or more mobile storage unit receiving spaces, wherein the replenishment station includes:
  two or more container receiving areas, wherein the two or more container receiving areas are located on a first side of the replenishment station; and
  two or more mobile storage unit receiving spaces, wherein the two or more mobile storage unit receiving spaces are located on a second side of the replenishment station, the first side being perpendicular to the second side relative to the robotic arm; and one or more automated guided vehicles ("AGVs") adapted to transport the one or more mobile storage units between the one or more mobile storage unit receiving spaces and a mobile storage unit storage area.

22. A system, comprising:

one or more containers adapted to hold one or more items;

one or more container transportation devices adapted to transport the one or more containers to one or more container receiving areas of a replenishment station;

the replenishment station including the one or more container receiving areas, one or more mobile storage unit receiving spaces, and a robotic arm, the robotic arm adapted to pick up the one or more items from the one or more containers in the one or more container receiving areas, move the one or more items, and place the one or more items into one or more mobile storage units in the one or more mobile storage unit receiving spaces;

one or more automated guided vehicles ("AGVs") adapted to transport the one or more mobile storage units between the one or more mobile storage unit receiving spaces and a mobile storage unit storage area, and the mobile storage unit storage area including:
  a storage area where a set of mobile storage units are stored, the storage area including a first set of shelves; and
  a mobile storage unit staging area associated with the replenishment station where a subset of the set of mobile storage units are stored, the one or more AGVs being adapted to transport one or more of the subset of mobile storage units between the first set of shelves and the mobile storage unit staging area, wherein the mobile storage unit staging area includes a second set of shelves adapted to hold the subset of mobile storage units, the second set of shelves being fewer in quantity than the first set of shelves, the second set of shelves being separate from and closer to the replenishment station than the first set of shelves.

* * * * *